United States Patent
Yamazaki et al.

(10) Patent No.: US 12,266,796 B2
(45) Date of Patent: Apr. 1, 2025

(54) POSITIVE ELECTRODE FOR SECONDARY BATTERY, SECONDARY BATTERY, AND ELECTRONIC DEVICE

(71) Applicant: SEMICONDUCTOR ENERGY LABORATORY CO., LTD., Atsugi (JP)

(72) Inventors: Shunpei Yamazaki, Tokyo (JP); Tatsuyoshi Takahashi, Kanagawa (JP); Kunihiko Suzuki, Kanagawa (JP); Kanta Abe, Kanagawa (JP); Yuji Iwaki, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 469 days.

(21) Appl. No.: 17/642,323

(22) PCT Filed: Sep. 7, 2020

(86) PCT No.: PCT/IB2020/058297
§ 371 (c)(1),
(2) Date: Mar. 11, 2022

(87) PCT Pub. No.: WO2021/053448
PCT Pub. Date: Mar. 25, 2021

(65) Prior Publication Data
US 2022/0344654 A1    Oct. 27, 2022

(30) Foreign Application Priority Data
Sep. 20, 2019    (JP) ................................ 2019-170987

(51) Int. Cl.
*H01M 4/525*    (2010.01)
*H01M 4/36*    (2006.01)
(Continued)

(52) U.S. Cl.
CPC ........... *H01M 4/525* (2013.01); *H01M 4/366* (2013.01); *H01M 10/0525* (2013.01);
(Continued)

(58) Field of Classification Search
CPC ......... H01M 10/0525; H01M 10/0562; H01M 10/0585; H01M 2004/028; H01M 4/366; H01M 4/525; H01M 50/431; Y02E 60/10
See application file for complete search history.

(56) References Cited

U.S. PATENT DOCUMENTS

| 7,709,151 B2 | 5/2010 | Inoue et al. |
| 8,080,337 B2 | 12/2011 | Higuchi et al. |

(Continued)

FOREIGN PATENT DOCUMENTS

| CN | 001532967 A | 9/2004 |
| CN | 101346835 A | 1/2009 |

(Continued)

OTHER PUBLICATIONS

International Search Report (Application No. PCT/IB2020/058297) dated Dec. 8, 2020.

(Continued)

*Primary Examiner* — Victoria H Lynch
(74) *Attorney, Agent, or Firm* — Fish & Richardson P.C.

(57) ABSTRACT

Provided is a positive electrode for a secondary battery, which has a small change in a crystal structure due to charging and discharging and has excellent cycle performance. The positive electrode for a secondary battery includes n positive electrode active material layers (n is an integer greater than or equal to 2), n−1 separation layer(s), and a positive electrode current collector layer. The positive electrode active material layers and the separation layer(s) are alternately stacked. The positive electrode active material layer contains lithium, cobalt, and oxygen. The separa- (Continued)

tion layer contains a titanium compound. Titanium oxide and titanium nitride are preferable as the titanium compound, and titanium oxide is particularly preferable.

12 Claims, 28 Drawing Sheets

(51) Int. Cl.
H01M 10/0525 (2010.01)
H01M 10/0562 (2010.01)
H01M 10/0585 (2010.01)
H01M 50/431 (2021.01)
H01M 4/02 (2006.01)

(52) U.S. Cl.
CPC ............... H01M 10/0562 (2013.01); H01M 10/0585 (2013.01); H01M 50/431 (2021.01); H01M 2004/028 (2013.01)

(56) References Cited

U.S. PATENT DOCUMENTS

| 8,999,575 | B2 | 4/2015 | Lee et al. |
| 9,852,850 | B2 | 12/2017 | Inoue et al. |
| 2002/0110736 | A1 | 8/2002 | Kweon et al. |
| 2003/0104279 | A1 | 6/2003 | Miyazaki et al. |
| 2004/0142241 | A1 | 7/2004 | Nagayama |
| 2004/0191628 | A1 | 9/2004 | Inoue et al. |
| 2006/0263690 | A1 | 11/2006 | Suhara et al. |
| 2007/0117014 | A1 | 5/2007 | Saito et al. |
| 2008/0241693 | A1 | 10/2008 | Fukuchi et al. |
| 2009/0011336 | A1 | 1/2009 | Inoue et al. |
| 2009/0087362 | A1 | 4/2009 | Sun et al. |
| 2009/0104532 | A1 | 4/2009 | Hosoya |
| 2010/0086854 | A1 | 4/2010 | Kumar et al. |
| 2010/0086857 | A1 | 4/2010 | Higuchi et al. |
| 2010/0190051 | A1 | 7/2010 | Aitken et al. |
| 2010/0247986 | A1 | 9/2010 | Toyama et al. |
| 2012/0021284 | A1 | 1/2012 | Lee et al. |
| 2013/0052534 | A1 | 2/2013 | Fujiki et al. |
| 2013/0323596 | A1 | 12/2013 | Morita et al. |
| 2016/0013478 | A1 | 1/2016 | Satow et al. |
| 2016/0276659 | A1 | 9/2016 | Choi et al. |
| 2018/0013130 | A1 | 1/2018 | Ochiai et al. |
| 2018/0145317 | A1 | 5/2018 | Momma et al. |
| 2018/0145368 | A1 | 5/2018 | Ochiai et al. |
| 2020/0176770 | A1 | 6/2020 | Takahashi et al. |
| 2021/0083281 | A1 | 3/2021 | Mikami et al. |

FOREIGN PATENT DOCUMENTS

| CN | 102339980 A | 2/2012 |
| CN | 105655554 A | 6/2016 |
| EP | 2410600 A | 1/2012 |
| JP | 2000-203842 A | 7/2000 |
| JP | 2002-216760 A | 8/2002 |
| JP | 2004-288579 A | 10/2004 |
| JP | 2009-170183 A | 7/2009 |
| JP | 2010-080407 A | 4/2010 |
| JP | 2012-028322 A | 2/2012 |
| JP | 2015-099722 A | 5/2015 |
| JP | 2018-206747 A | 12/2018 |
| KR | 10-1076501 | 10/2011 |
| KR | 10-1202334 | 11/2012 |
| WO | WO-2007/077870 | 7/2007 |

OTHER PUBLICATIONS

Written Opinion (Application No. PCT/IB2020/058297) dated Dec. 8, 2020.

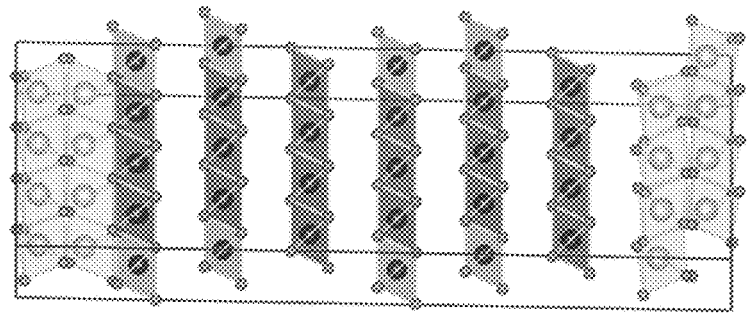
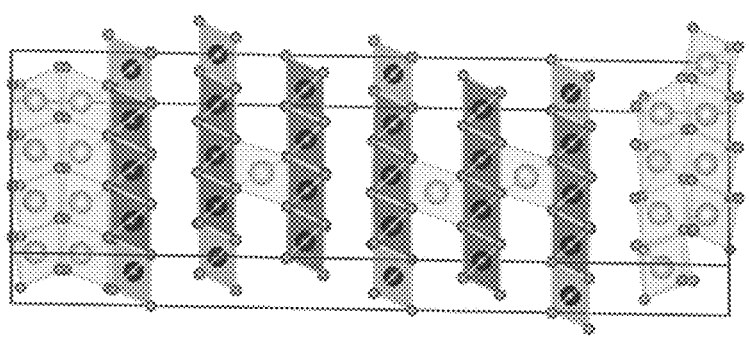
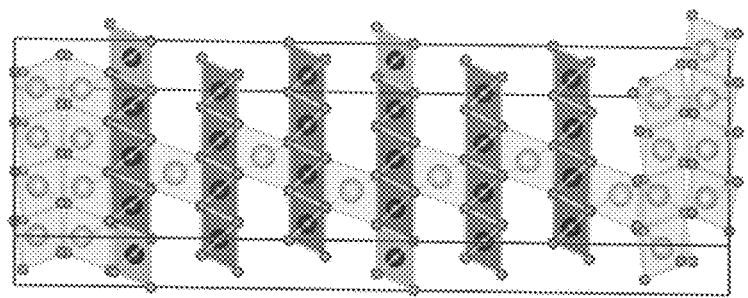
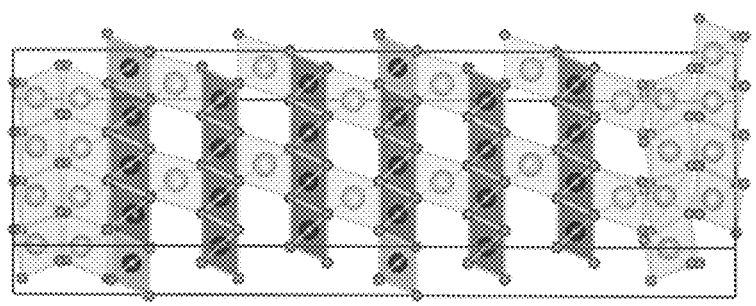
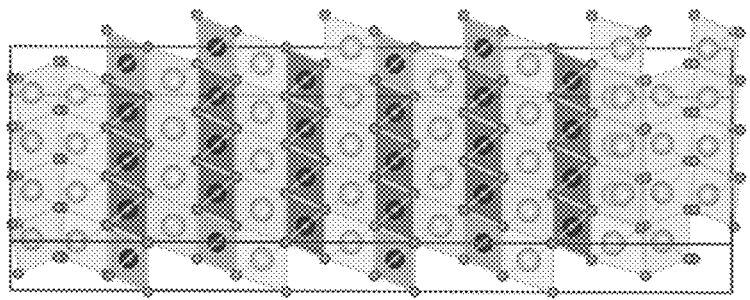

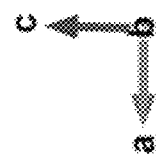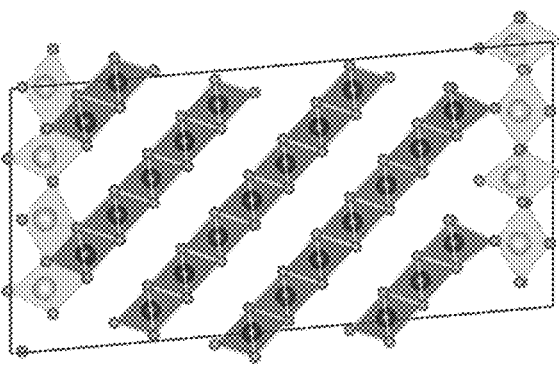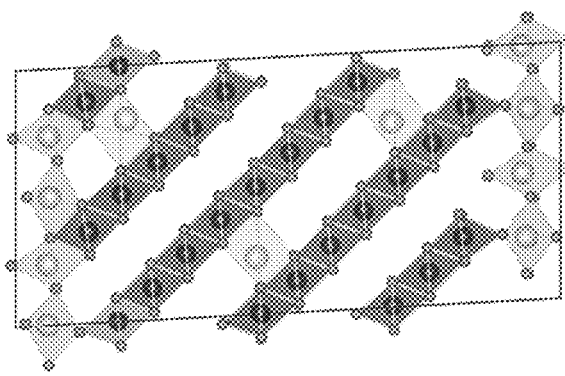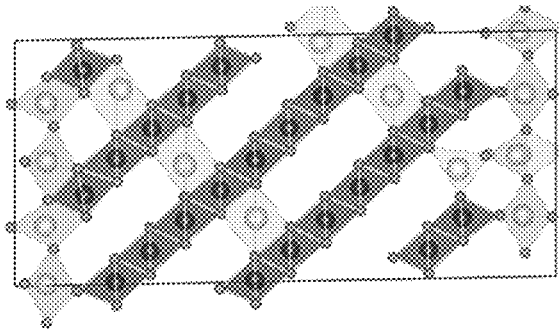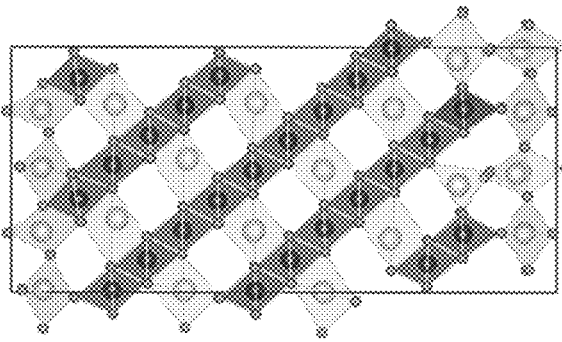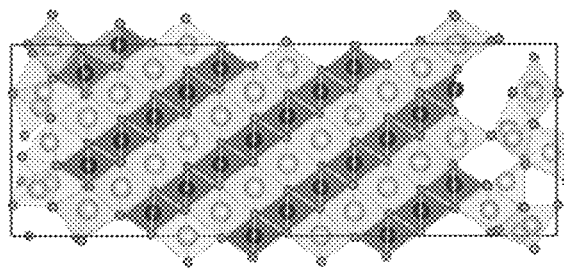
FIG. 7A  FIG. 7B  FIG. 7C  FIG. 7D  FIG. 7E

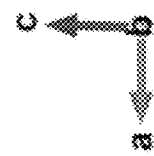
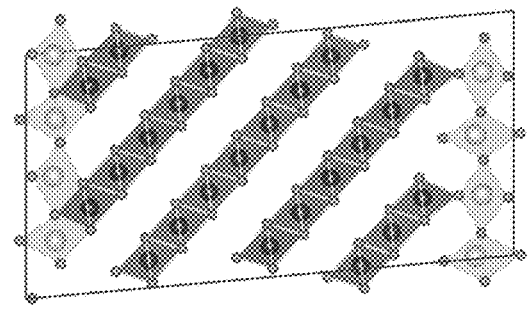
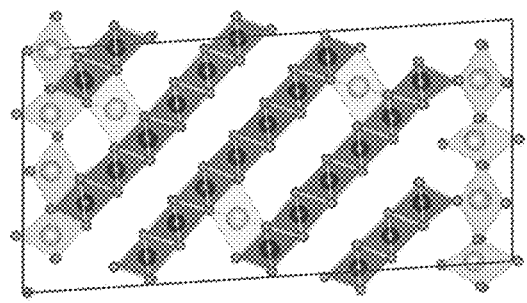
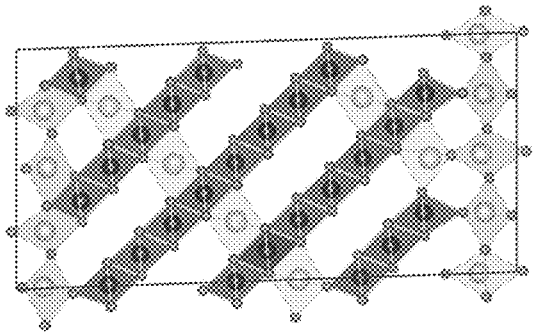
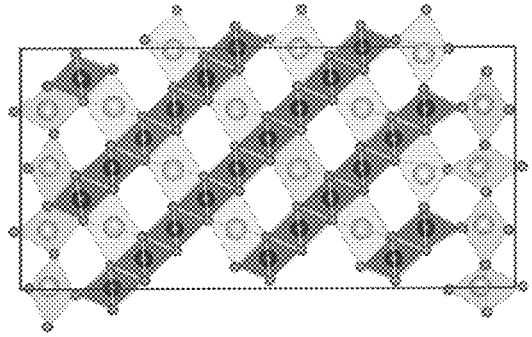
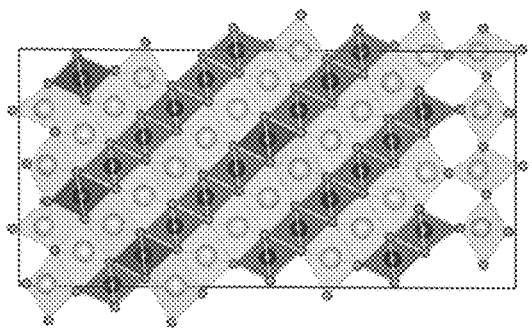

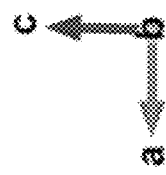
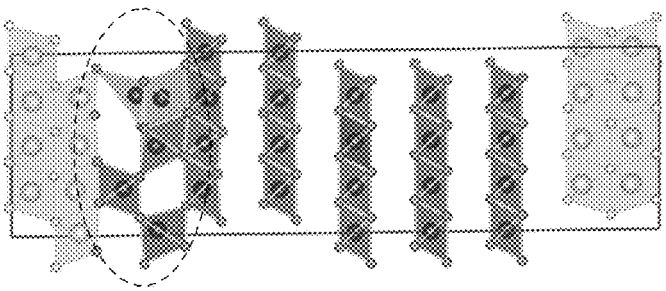
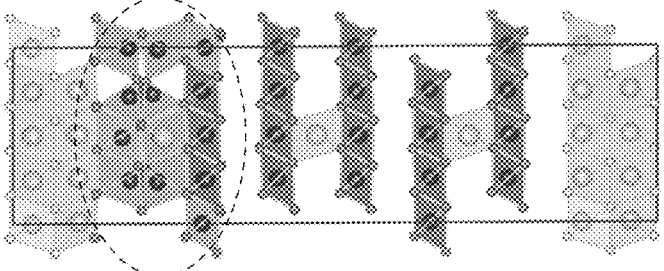
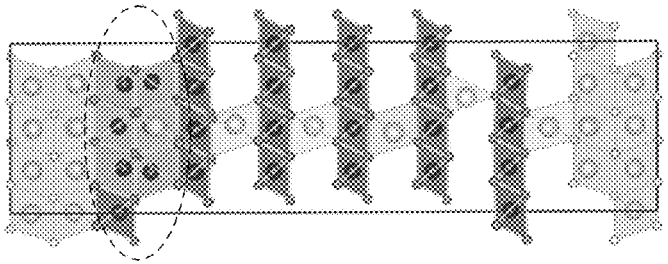
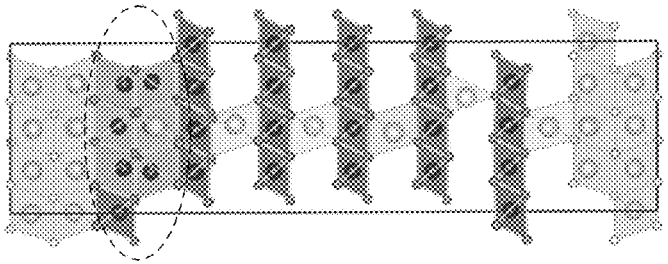
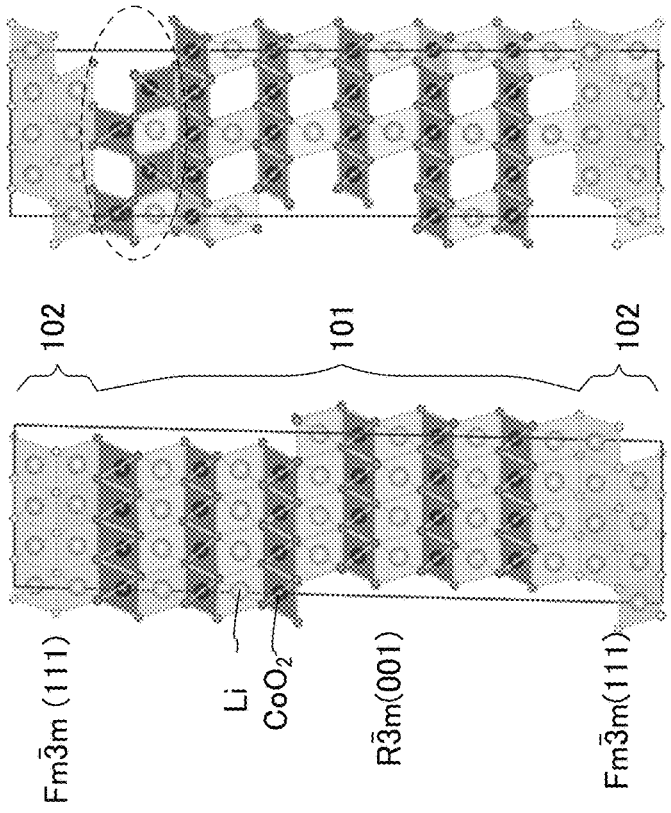

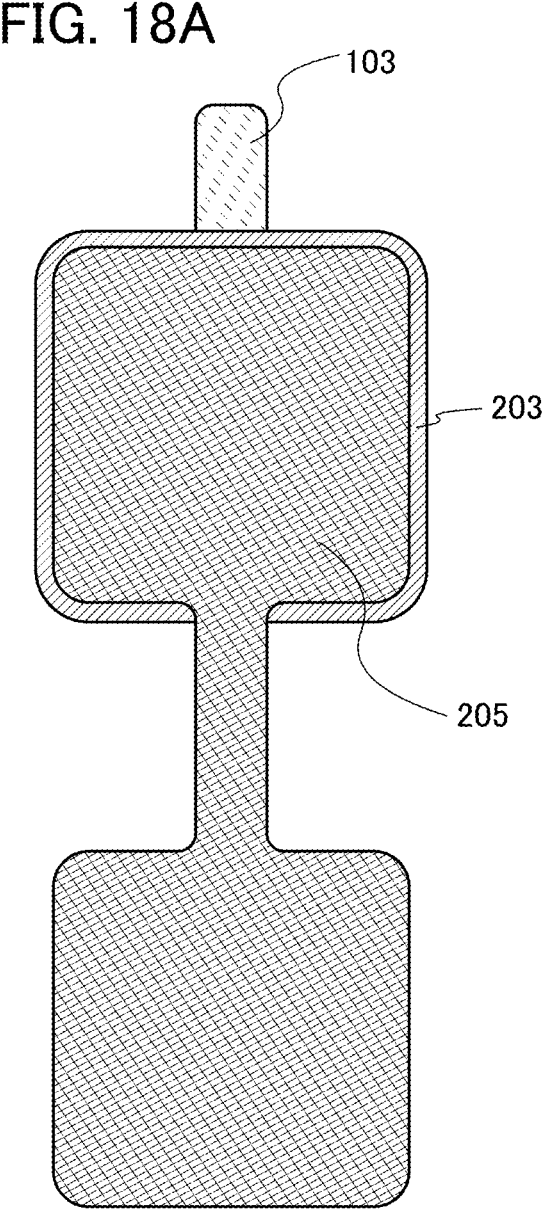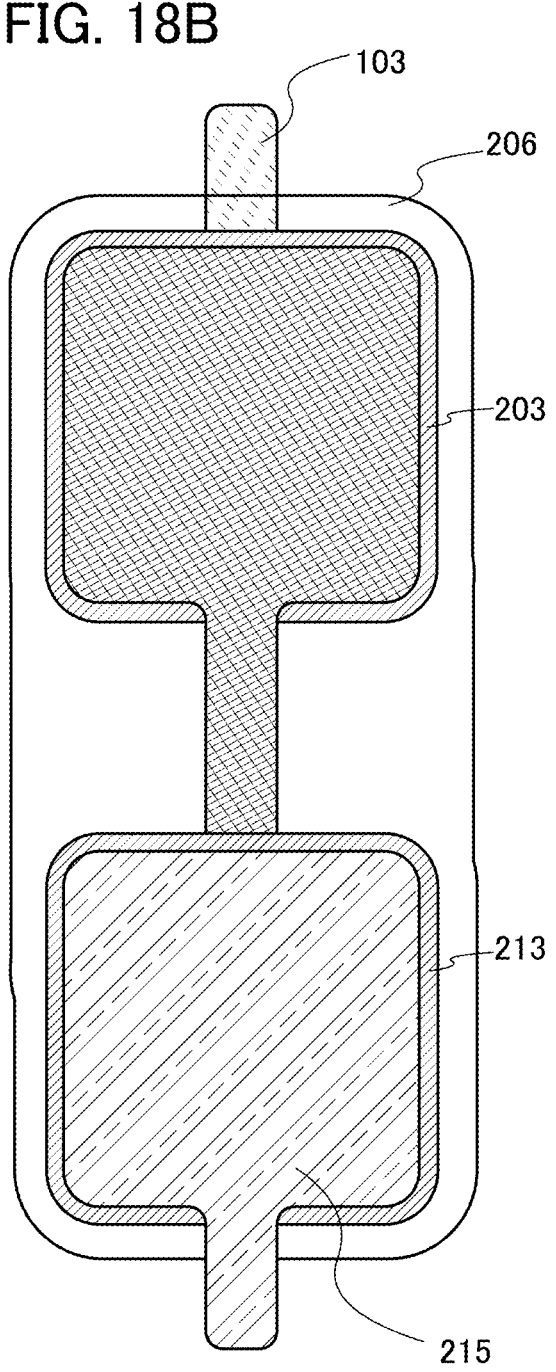

700

705A

750

POSITIVE ELECTRODE FOR SECONDARY BATTERY, SECONDARY BATTERY, AND ELECTRONIC DEVICE

CROSS REFERENCE TO RELATED APPLICATIONS

This application is a U.S. National Phase Application under 35 U.S.C. § 371 of International Application PCT/IB2020/058297, filed on Sep. 7, 2020, which is incorporated by reference and claims the benefit of a foreign priority application filed in Japan on Sep. 20, 2019, as Application No. 2019-170987.

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof.

Note that electronic devices in this specification generally mean devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, air batteries, and all-solid batteries have been actively developed. In particular, demand for lithium-ion secondary batteries with high output and high capacity has rapidly grown with the development of the semiconductor industry, and the lithium-ion secondary batteries are essential as rechargeable energy supply sources for the current information society.

As the demand expands, the lithium-ion secondary batteries are required to have higher performance. Thus, the positive electrode active material has been improved to enhance the capacity and cycle performance of lithium-ion secondary batteries (e.g., Patent Document 1).

Moreover, among the lithium-ion secondary batteries, an all-solid-state battery having higher safety has been developed. A thin-film secondary battery in which a positive electrode, an electrolyte, and a negative electrode are formed by PVD (physical vapor deposition), CVD (chemical vapor deposition), or the like is one kind of all-solid-state battery (e.g., Patent Document 2).

REFERENCE

Patent Document

[Patent Document 1] Japanese Published Patent Application No. 2018-206747
[Patent Document 2] Specification of United States Patent Application Publication No. 2010/0190051

SUMMARY OF THE INVENTION

Problems to be Solved by the Invention

There is room for improvement in a variety of aspects such as charge and discharge characteristics, cycle performance, reliability, safety, and costs of thin-film secondary batteries. A method for increasing the depth of charge is an example of a method for increasing the discharge capacity of a secondary battery.

However, when charging is performed in which the depth of charge is 0.75 or more (the lithium filling rate is 25% or less), for example, the crystal structure of a positive electrode active material layer is likely to be broken and the charge and discharge capacity is likely to decrease as charging and discharging are repeated.

Thus, an object of one embodiment of the present invention is to provide a positive electrode for a secondary battery, which has a crystal structure that is not easily broken by repeated charging and discharging. Another object is to provide a positive electrode for a secondary battery, which has excellent charge and discharge cycle performance. Another object is to provide a positive electrode for a secondary battery, which has high charge and discharge capacity. Another object is to provide a positive electrode for a secondary battery, in which a decrease in capacity in charge and discharge cycles is inhibited. Another object is to provide a secondary battery with excellent charge and discharge cycle performance. Another object is to provide a secondary battery with high charge and discharge capacity. Another object is to provide a highly safe or reliable secondary battery.

Another object of one embodiment of the present invention is to provide a novel material, novel active material particles, a novel power storage device, or a manufacturing method thereof.

Note that the description of these objects does not preclude the existence of other objects. One embodiment of the present invention does not have to achieve all these objects. Other objects can be derived from the description of the specification, the drawings, and the claims.

Means for Solving the Problems

One embodiment of the present invention is a positive electrode for a secondary battery. The positive electrode for a secondary battery includes n positive electrode active material layers (n is an integer greater than or equal to 2), n−1 separation layer(s), and a positive electrode current collector layer. The positive electrode active material layers and the separation layer(s) are alternately stacked. The positive electrode active material layer contains lithium, cobalt, and oxygen. The separation layer contains a titanium compound.

In the above, it is preferable that the positive electrode active material layer contain lithium cobalt oxide, the separation layer contain titanium oxide, and a (001) plane of a crystal structure belonging to the space group R-3m of the positive electrode active material layer be parallel to a (100) plane of a crystal structure belonging to the space group P42/mnm of the separation layer.

Alternatively, in the above, it is preferable that the positive electrode active material layer contain lithium cobalt oxide, the separation layer contain titanium nitride, and a (001) plane of a crystal structure belonging to the space group R-3m of the positive electrode active material layer be parallel to a (100) plane of a crystal structure belonging to the space group Fm-3m of the separation layer.

In the above, it is preferable that the positive electrode active material layer contain one or more of nickel, aluminum, magnesium, and fluorine. In the above, it is preferable that the positive electrode active material layer contain nickel, aluminum, magnesium, and fluorine, and, assume that the number of cobalt atoms contained in the positive electrode active material layer is 100, the number of nickel atoms be greater than or equal to 0.05 and less than or equal to 2, the number of aluminum atoms be greater than or equal to 0.05 and less than or equal to 2, and the number of magnesium atoms be greater than or equal to 0.1 and less than or equal to 6.

One embodiment of the present invention is a secondary battery including the above positive electrode for a secondary battery, a solid electrolyte, and a negative electrode.

One embodiment of the present invention is an electronic device including the above secondary battery.

Effect of the Invention

According to one embodiment of the present invention, a positive electrode for a secondary battery, which has a crystal structure that is not easily broken by repeated charging and discharging, can be provided. A positive electrode for a secondary battery, which has excellent charge and discharge cycle performance, can be provided. A positive electrode for a secondary battery, which has high charge and discharge capacity, can be provided. A positive electrode for a secondary battery, in which a decrease in capacity in charge and discharge cycles is inhibited, can be provided. A secondary battery with excellent charge and discharge cycle performance can be provided. A secondary battery with high charge and discharge capacity can be provided. A highly safe or reliable secondary battery can be provided.

According to one embodiment of the present invention, a novel material, novel active material particles, a novel power storage device, or a manufacturing method thereof can be provided.

Note that the description of these effects does not preclude the existence of other effects. One embodiment of the present invention does not have to have all of these effects. Other effects will be apparent from and can be derived from the description of the specification, the drawings, the claims, and the like.

BRIEF DESCRIPTION OF THE DRAWINGS

FIG. 4A to FIG. 4E are diagrams each illustrating a crystal structure of a positive electrode of one embodiment of the present invention.

FIG. 7A to FIG. 7E are diagrams each illustrating a crystal structure of a positive electrode of one embodiment of the present invention.

FIG. 8A to FIG. 8E are diagrams each illustrating a crystal structure of a positive electrode of one embodiment of the present invention.

FIG. 11A to FIG. 11E are diagrams each illustrating a crystal structure of a positive electrode of a comparative example.

FIG. 18A and FIG. 18B are top views illustrating one embodiment of the present invention.

MODE FOR CARRYING OUT THE INVENTION

Figure 1A:
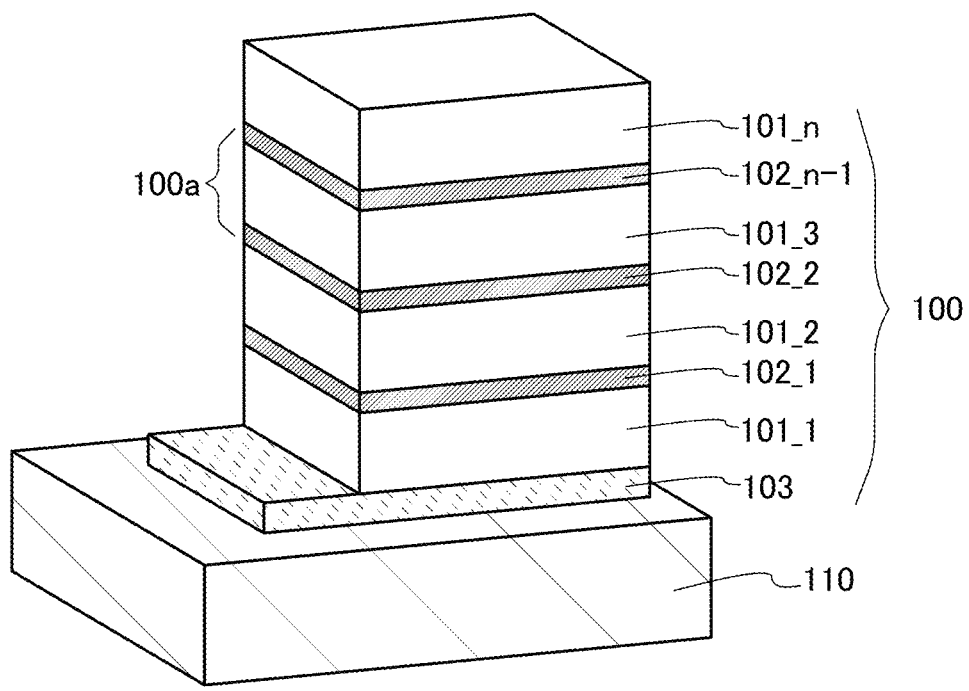
FIG. 1A is a perspective view of a positive electrode of one embodiment of the present invention.

Embodiments of the present invention are described in detail below with reference to the drawings. Note that the present invention is not limited to the following description, and it is readily understood by those skilled in the art that modes and details of the present invention can be modified in various ways. In addition, the present invention should not be construed as being limited to the description of the embodiments below.

The Miller index is used for the expression of crystal planes and orientations in this specification and the like. An individual plane representing a crystal plane is denoted by "( )". In the crystallography, a bar is placed over a number in the expression of crystal planes, orientations, and space groups; however, in this specification and the like, because of application format limitations, crystal planes, orientations, and space groups are sometimes expressed by placing a minus sign (−) before a number instead of placing a bar over the number.

In this specification and the like, a layered rock-salt crystal structure of a composite oxide containing lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist. Moreover, in the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, theoretical capacity of a positive electrode active material refers to the amount of electricity at the time when lithium that can be inserted and extracted and is contained in a positive electrode active material is all extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, a depth of charge at the time when lithium that can be inserted and extracted is all inserted is 0, and a depth of charge at the time when lithium that can be inserted and extracted and is contained in a positive electrode active material is all extracted is 1. Furthermore, a lithium filling rate at the time when lithium that can be inserted and extracted is all inserted may be 100%, and a lithium filling rate at the time when lithium that can be inserted and extracted and is contained in a positive electrode active material is all extracted may be 0%.

In this specification and the like, the expression "planes are parallel to each other" refers to not only the case where the planes are exactly parallel numerically but also the case where an angle formed between the planes is 5° or less, preferably 2.5° or less.

Embodiment 1

A positive electrode for a secondary battery of one embodiment of the present invention and a crystal structure of the positive electrode for a secondary battery are described with reference to FIG. 1 to FIG. 12.

FIG. 1A is a perspective view of a positive electrode 100 of one embodiment of the present invention. The positive electrode 100 includes n positive electrode active material layers 101, n−1 separation layer(s) 102, and a positive electrode current collector layer 103. Note that n is an integer greater than or equal to 2. FIG. 1A illustrates the case where n=4. The positive electrode active material layers 101 and the separation layers 102 are alternately stacked. The positive electrode 100 is formed over a substrate 110.

The separation layer 102 is provided between the positive electrode active material layers 101 and has a function of stabilizing the crystal structure of the positive electrode active material layers 101.

Figure 1B:
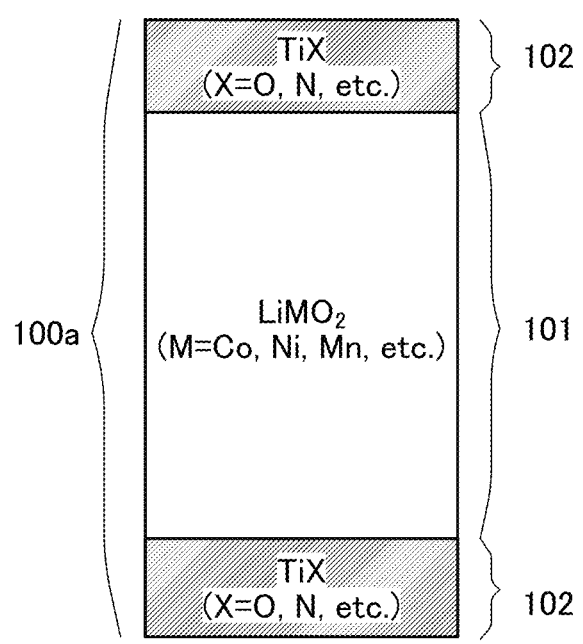
FIG. 1B is a diagram illustrating a stacked structure of the positive electrode of one embodiment of the present invention.

FIG. 1B is a diagram illustrating a region 100a illustrated in FIG. 1A. The region 100a is a region including one positive electrode active material layer 101 and two separation layers 102 sandwiching the positive electrode active material layer 101.

The separation layer 102 contains a titanium compound TiX. X is an anion of oxygen, nitrogen, or the like. That is, the separation layer 102 contains titanium oxide, titanium nitride, titanium oxide in which nitrogen substitutes for part of oxygen, titanium nitride in which oxygen substitutes for part of nitrogen, or titanium oxynitride ($TiO_xN_y$, $0<x<2$, $0<y<1$), for example. Titanium and oxygen are materials that can be contained in a solid electrolyte. Thus, titanium oxide is particularly suitably used for the separation layer 102.

The positive electrode active material layer 101 contains lithium, a transition metal M, and oxygen. In other words, the positive electrode active material layer 101 contains a composite oxide containing lithium and the transition metal M.

As the transition metal M contained in the positive electrode active material layer 101, a metal that can form, together with lithium, a layered rock-salt composite oxide belonging to the space group R-3m is used. For example, one or more of manganese, cobalt, and nickel can be used as the transition metal M. That is, as the transition metal contained in the positive electrode active material layer 101, only cobalt may be used, only nickel may be used, a combination of cobalt and manganese or a combination of cobalt and nickel may be used, or a combination of cobalt, manganese, and nickel may be used. In other words, the positive electrode active material layer 101 can contain a composite oxide containing lithium and the transition metal M, such as lithium cobalt oxide, lithium nickel oxide, lithium cobalt oxide in which manganese substitutes for part of cobalt, lithium cobalt oxide in which nickel substitutes for part of cobalt, or lithium nickel-manganese-cobalt oxide.

The positive electrode active material layer 101 may contain an element other than the transition metal M, such as magnesium, fluorine, or aluminum in addition to the above elements. Such elements further stabilize the crystal structure of the positive electrode active material layer 101 in some cases. In other words, the positive electrode active material layer 101 can contain lithium cobalt oxide to which magnesium and fluorine are added, lithium nickel-cobalt oxide to which magnesium and fluorine are added, lithium cobalt-aluminum oxide to which magnesium and fluorine are added, lithium nickel-cobalt-aluminum oxide, lithium nickel-cobalt-aluminum oxide to which magnesium and fluorine are added, or the like.

In the case where the positive electrode active material layer 101 contains lithium, cobalt, nickel, aluminum, magnesium, oxygen, and fluorine, assume that the number of cobalt atoms contained in the positive electrode active material layer 101 is 100, the number of nickel atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Assume that the number of cobalt atoms contained in the positive electrode active material layer 101 is 100, the number of aluminum atoms is preferably greater than or equal to 0.05 and less than or equal to 2, further preferably greater than or equal to 0.1 and less than or equal to 1.5, still further preferably greater than or equal to 0.1 and less than or equal to 0.9, for example. Assume that the number of cobalt atoms contained in the positive electrode active material layer 101 is 100, the number of magnesium atoms is preferably greater than or equal to 0.1 and less than or equal to 6, further preferably greater than or equal to 0.3 and less than or equal to 3, for example. Assume that the number of magnesium atoms contained in the positive electrode active material layer 101 is 1, the number of fluorine atoms is preferably greater than or equal to 2 and less than or equal to 3.9, for example.

For the positive electrode current collector layer 103, a material having high conductivity, such as a metal of gold, platinum, aluminum, titanium, copper, magnesium, iron, cobalt, nickel, zinc, germanium, indium, silver, or palladium, an alloy thereof, or the like can be used. Alternatively, a nitride, an oxide, or the like of the metal may be used. For example, titanium nitride has sufficient conductivity and has a rock-salt crystal structure. Therefore, for the same reason to be described later with reference to FIG. 9 and FIG. 10, titanium nitride is particularly preferably used for the positive electrode current collector layer 103 in the case where a material having a layered rock-salt crystal structure is used for the positive electrode active material layer 101. Alternatively, it is possible to use, for the positive electrode current collector layer 103, aluminum to which an element that improves heat resistance, such as silicon, titanium, neodymium, scandium, or molybdenum, is added. Still alternatively, the positive electrode current collector layer 103 may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel.

Figure 2:
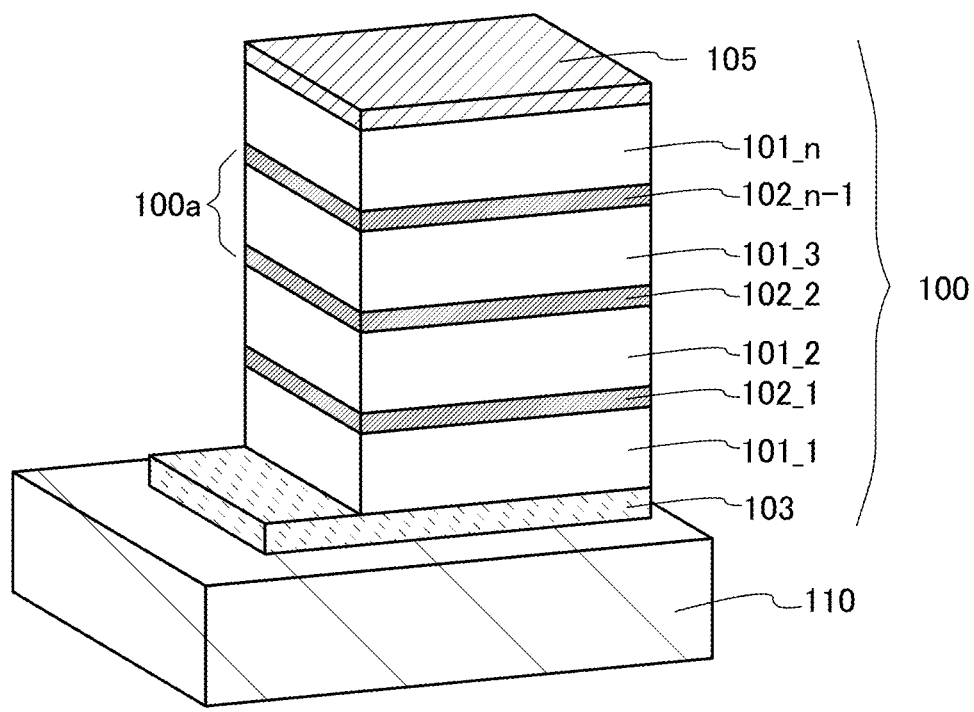
FIG. 2 is a diagram illustrating a stacked structure of a positive electrode of one embodiment of the present invention.

The positive electrode 100 of one embodiment of the present invention may include a cap layer 105 as illustrated in FIG. 2. The cap layer 105 is provided over the positive electrode active material layer 101_n, and has a function of stabilizing the crystal structure of the positive electrode active material layer 101. The cap layer 105 contains the titanium compound TiX. X is an anion of oxygen, nitrogen, or the like. That is, the cap layer 105 contains titanium oxide, titanium nitride, titanium oxide in which nitrogen substitutes for part of oxygen, titanium nitride in which oxygen substitutes for part of nitrogen, or titanium oxynitride ($TiO_xN_y$, $0<x<1$, $0<y<1$), for example. The cap layer 105 particularly preferably contains titanium oxide.

[Crystal Structure of One Embodiment of the Present Invention]

Figure 3A:
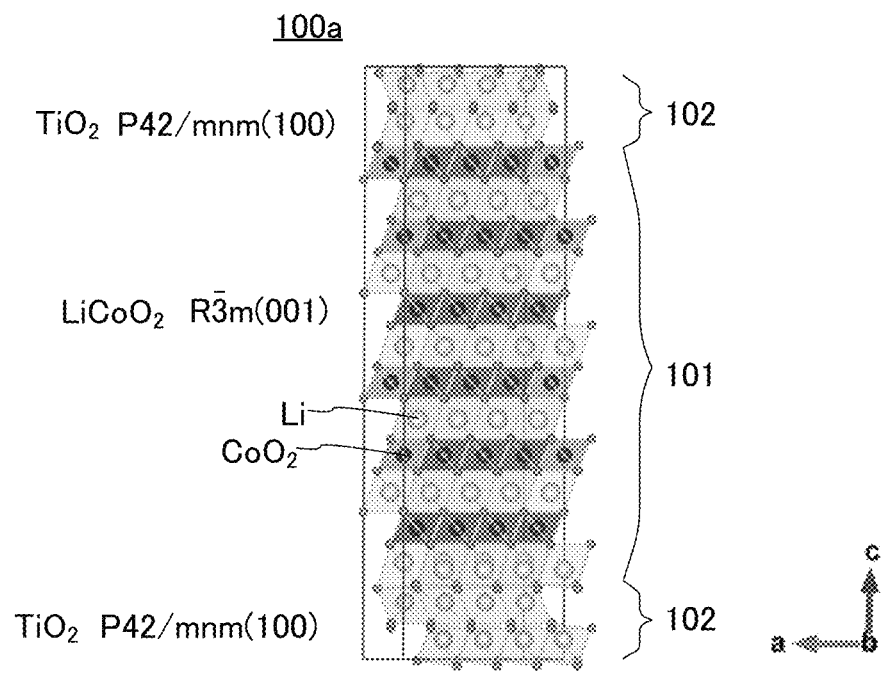
FIG. 3A and FIG. 3B are diagrams each illustrating a crystal structure of a positive electrode of one embodiment of the present invention.
Figure 3B:
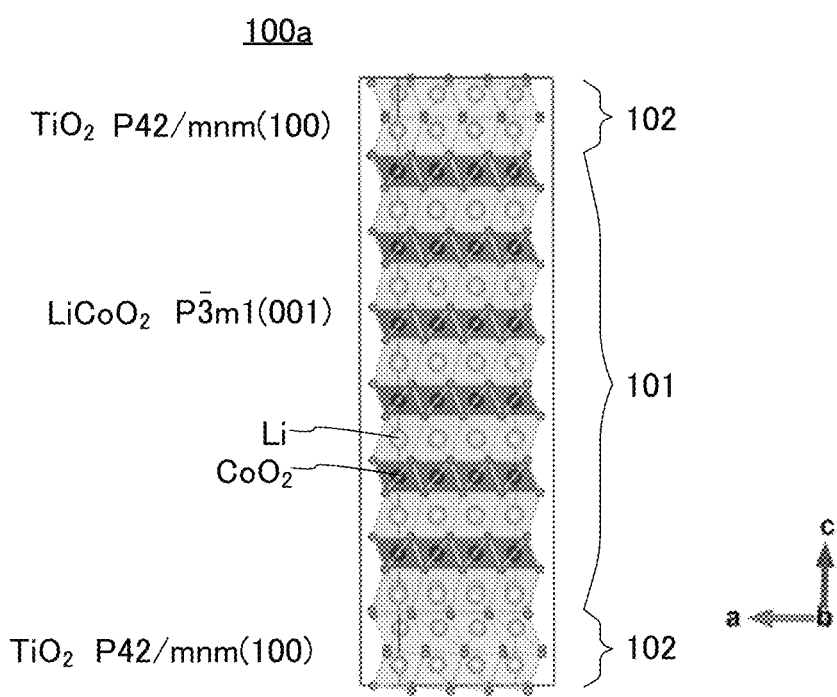

FIG. 3A and FIG. 3B are diagrams each illustrating an example of the crystal structure of the positive electrode of one embodiment of the present invention. For clear description, the region 100a that is part of the positive electrode 100 as illustrated in FIG. 1B is described below. In addition, the transition metal M is cobalt in the description.

FIG. 3A is a diagram of the case where the positive electrode active material layer 101 contains lithium cobalt oxide and has a layered rock-salt crystal structure belonging to the space group R-3m, and the separation layer 102 contains titanium oxide and has a rutile crystal structure belonging to the space group P42/mnm. In this case, as illustrated in FIG. 3A, a stack is preferably formed in the positive electrode 100 such that a (001) plane of the layered rock-salt crystal structure belonging to the space group R-3m of the positive electrode active material layer 101 is parallel to a (100) plane of the rutile crystal structure belonging to the space group P42/mnm of the separation layer 102. When the layers are stacked to satisfy these plane orientations, the separation layer 102 can fulfill its function of stabilizing a crystal structure very well, and thus the crystal structure of the positive electrode 100 is not easily broken even when charging and discharging in which the depth of charge is 0.75 or more are repeated.

As illustrated in FIG. 3B, the positive electrode active material layer 101 may have a crystal structure belonging to the space group P-3m1. Also in this case, a stack is preferably formed in the positive electrode 100 such that a (001) plane of the crystal structure belonging to the space group P-3m1 of the positive electrode active material layer 101 is parallel to a (100) plane of the rutile crystal structure belonging to the space group P42/mnm of the separation layer 102.

Results of calculating optimized crystal structures at various depths of charge (Li filling rates) in the cases of the above stacks are described. There are five patterns of the depth of charge: a depth of charge of 0 (a Li filling rate of 100%), a depth of charge of 0.75 (a Li filling rate of 25%), a depth of charge of 0.875 (a Li filling rate of 12.5%), a depth of charge of 0.9375 (a Li filling rate of 6.25%), and a depth of charge of 1 (a Li filling rate of 0). Table 1 shows other calculation conditions.

TABLE 1

| Software | VASP | |
|---|---|---|
| Functional | GGA + U (DFT-D2) | |
| Pseudopotential | PAW | |
| Cut-off energy (eV) | 600 | |
| U potential | Co | 4.91 |
| Number of atoms | $TiO_2$ for separation layer | Li 48, Co 48, O 160, Ti 32 |
| k-points | 1 × 1 × 1 | |
| Calculation object | Optimizing lattice and atomic position | |

FIG. 4A to FIG. 4E show the calculation results of the case where the positive electrode active material layer 101 has the layered rock-salt crystal structure belonging to the space group R-3m as illustrated in FIG. 3A. Notes of FIG. 3A can be referred to for a region, elements, crystal structures, and the like in FIG. 4A to FIG. 4E.

FIG. 4A is the calculation result of a depth of charge of 0 (a Li filling rate of 100%), FIG. 4B is the calculation result of a depth of charge of 0.75 (a Li filling rate of 25%), FIG. 4C is the calculation result of a depth of charge of 0.875 (a Li filling rate of 12.5%), FIG. 4D is the calculation result of a depth of charge of 0.9375 (a Li filling rate of 6.25%), and FIG. 4E is the calculation result of a depth of charge of 1 (a Li filling rate of 0).

FIG. 5A to FIG. 5E show the calculation results of the case where the positive electrode active material layer 101 has the crystal structure belonging to the space group P-3m1 as illustrated in FIG. 3B. Notes of FIG. 3B can be referred to for a region, elements, crystal structures, and the like in FIG. 5A to FIG. 5E.

Figure 5E:
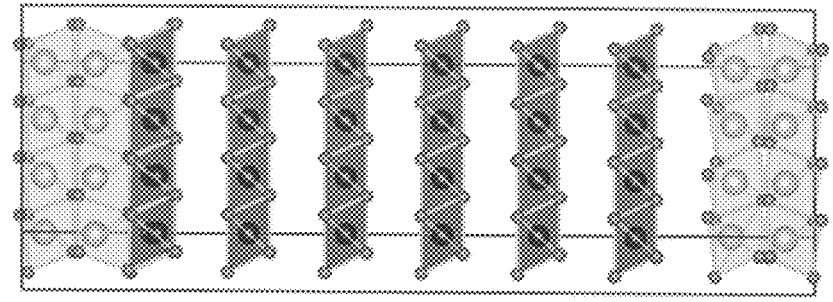
FIG. 5A to FIG. 5E are diagrams each illustrating a crystal structure of a positive electrode of one embodiment of the present invention.
Figure 5D:
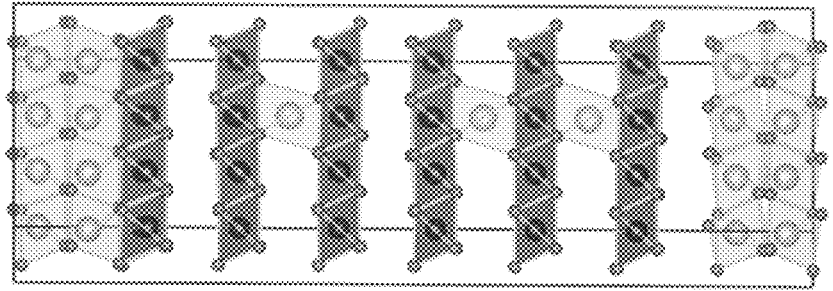
Figure 5C:
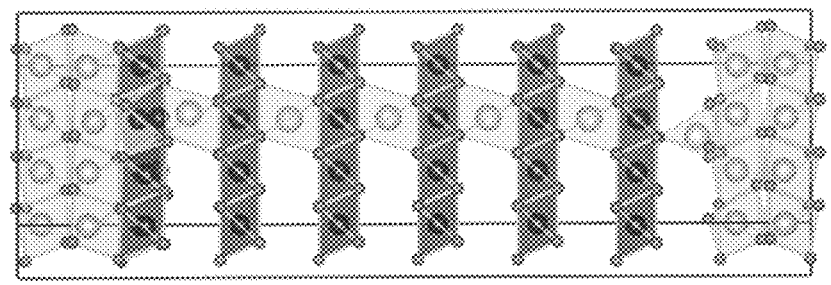
Figure 5B:
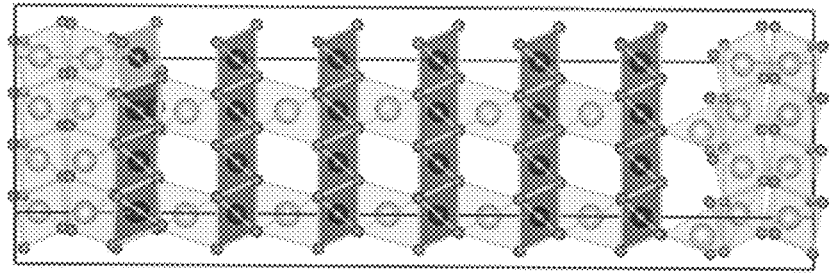
Figure 5A:
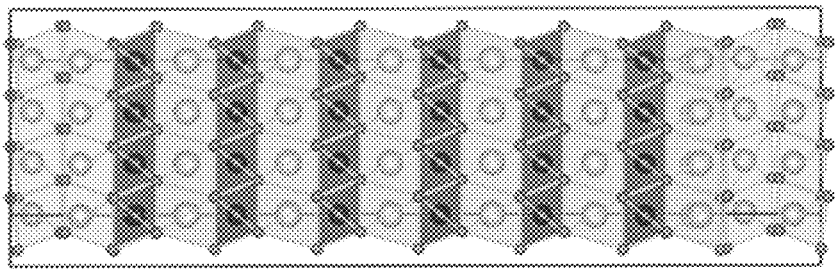

FIG. 5A is the calculation result of a depth of charge of 0 (a Li filling rate of 100%), FIG. 5B is the calculation result of a depth of charge of 0.75 (a Li filling rate of 25%), FIG. 5C is the calculation result of a depth of charge of 0.875 (a Li filling rate of 12.5%), FIG. 5D is the calculation result of a depth of charge of 0.9375 (a Li filling rate of 6.25%), and FIG. 5E is the calculation result of a depth of charge of 1 (a Li filling rate of 0).

As illustrated in FIG. 4A to FIG. 4E and FIG. 5A to FIG. 5E, layers composed of $CoO_2$ octahedrons can be stably kept at any of the depths of charge.

Therefore, in the positive electrode 100 having the stacked structure as illustrated in FIG. 3A or FIG. 3B, the crystal structure of the positive electrode active material layer 101 is stable even when the depth of charge becomes deeper. Thus, the positive electrode has excellent cycle performance in which the charge and discharge capacity hardly decreases even when charging and discharging are repeated at a deep depth of charge.

Another example of a crystal structure of the positive electrode of one embodiment of the present invention is described with reference to FIG. 6A and FIG. 6B.

Figure 6A:
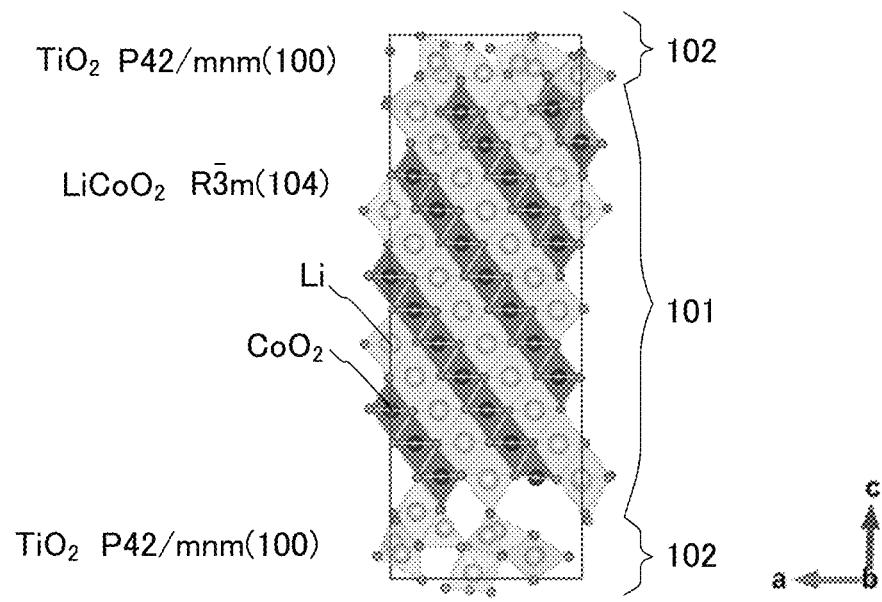
FIG. 6A and FIG. 6B are diagrams each illustrating a crystal structure of a positive electrode of one embodiment of the present invention.

FIG. 6A is a diagram of the case where the positive electrode active material layer 101 contains lithium cobalt oxide and has a layered rock-salt crystal structure belonging to the space group R-3m, and the separation layer 102 contains titanium oxide and has a rutile crystal structure belonging to the space group P42/mnm. In this case, as illustrated in FIG. 3A, a stack is preferably formed in the positive electrode 100 such that a (104) plane of the layered rock-salt crystal structure belonging to the space group R-3m of the positive electrode active material layer 101 is parallel to a (100) plane of the rutile crystal structure belonging to the space group P42/mnm of the separation layer 102.

Figure 6B:
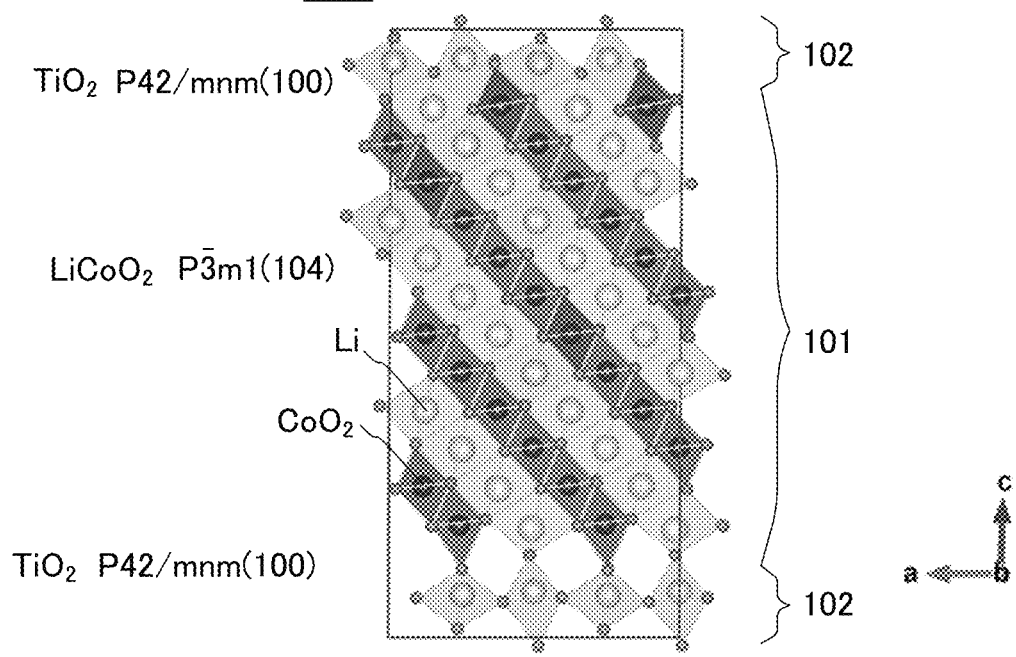

As illustrated in FIG. 6B, the positive electrode active material layer 101 may have a crystal structure belonging to the space group P-3m1. Also in this case, a stack is preferably formed in the positive electrode 100 such that a (104) plane of the crystal structure belonging to the space group P-3m1 of the positive electrode active material layer 101 is parallel to a (100) plane of the rutile crystal structure belonging to the space group P42/mnm of the separation layer 102.

As in FIG. 4A to FIG. 5E, results of calculating optimized crystal structures in the cases of the above stacks are described.

FIG. 7A to FIG. 7E show the calculation results of the case where the positive electrode active material layer 101 has the layered rock-salt crystal structure belonging to the space group R-3m as illustrated in FIG. 6A. Notes of FIG. 6A can be referred to for a region, elements, crystal structures, and the like in FIG. 7A to FIG. 7E.

FIG. 7A is the calculation result of a depth of charge of 0 (a Li filling rate of 100%), FIG. 7B is the calculation result of a depth of charge of 0.75 (a Li filling rate of 25%), FIG. 7C is the calculation result of a depth of charge of 0.875 (a Li filling rate of 12.5%), FIG. 7D is the calculation result of a depth of charge of 0.9375 (a Li filling rate of 6.25%), and FIG. 7E is the calculation result of a depth of charge of 1 (a Li filling rate of 0).

FIG. 8A to FIG. 8E show the calculation results of the case where the positive electrode active material layer 101 has the crystal structure belonging to the space group P-3m1 as illustrated in FIG. 6B. Notes of FIG. 6B can be referred to for a region, elements, crystal structures, and the like in FIG. 8A to FIG. 8E.

FIG. 8A is the calculation result of a depth of charge of 0 (a Li filling rate of 100%), FIG. 8B is the calculation result of a depth of charge of 0.75 (a Li filling rate of 25%), FIG. 8C is the calculation result of a depth of charge of 0.875 (a Li filling rate of 12.5%), FIG. 8D is the calculation result of a depth of charge of 0.9375 (a Li filling rate of 6.25%), and FIG. 8E is the calculation result of a depth of charge of 1 (a Li filling rate of 0).

As illustrated in FIG. 7A to FIG. 7E and FIG. 8A to FIG. 8E, layers composed of $CoO_2$ octahedrons can be stably kept at any of the depths of charge.

Therefore, in the positive electrode 100 having the stacked structure as illustrated in FIG. 6A or FIG. 6B, the crystal structure of the positive electrode active material layer 101 is stable even when the depth of charge becomes deeper. Thus, the positive electrode has excellent cycle performance in which the charge and discharge capacity hardly decreases even when charging and discharging are repeated at a deep depth of charge.

Another example of a crystal structure of the positive electrode of one embodiment of the present invention is described with reference to FIG. 9.

Figure 9:
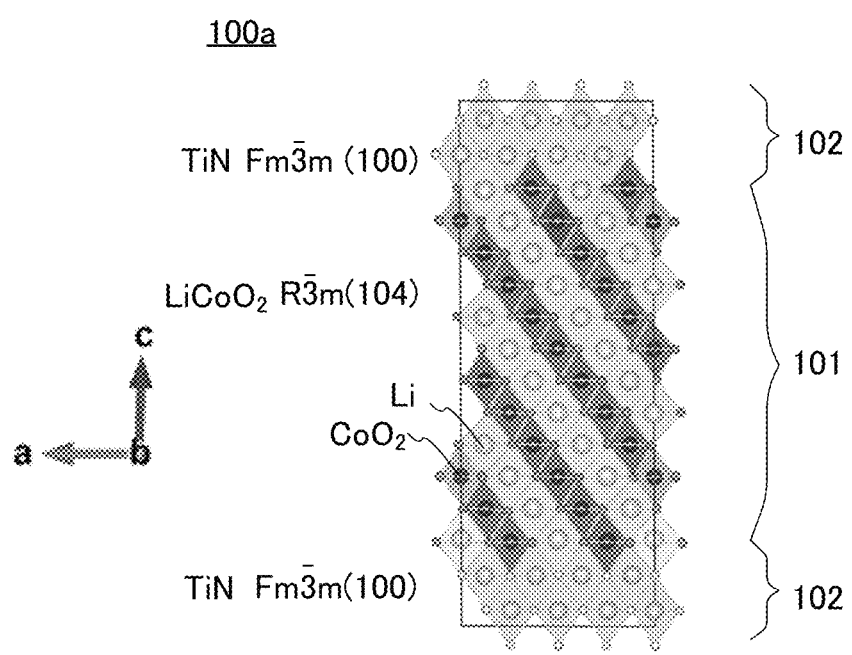
FIG. 9 is a diagram illustrating a crystal structure of a positive electrode of one embodiment of the present invention.

FIG. 9 is a diagram of the case where the positive electrode active material layer 101 contains lithium cobalt oxide and has a layered rock-salt crystal structure belonging to the space group R-3m, and the separation layer 102 contains titanium nitride and has a rock-salt crystal structure belonging to the space group Fm-3m. In this case, as illustrated in FIG. 9, a stack is preferably formed in the positive electrode 100 such that a (104) plane of the layered rock-salt crystal structure belonging to the space group R-3m of the positive electrode active material layer 101 is parallel to a (100) plane of the rock-salt crystal structure belonging to the space group Fm-3m of the separation layer 102.

As in FIG. 4 and FIG. 5, results of calculating optimized crystal structures in the case of the above stack are shown in FIG. 10A to FIG. 10F. Table 2 shows calculation conditions. Notes of FIG. 9 can be referred to for a region, elements, crystal structures, and the like in FIG. 10A to FIG. 10F.

TABLE 2

| Software | VASP | |
|---|---|---|
| Functional | GGA + U (DFT-D2) | |
| Pseudopotential | PAW | |
| Cut-off energy (eV) | 600 | |
| U potential | Co | 4.91 |
| Number of atoms | TiN for separation layer | Li 48, Co 48, O 96, Ti 32, N 32 |
| k-points | 1 × 1 × 1 | |
| Calculation object | Optimizing lattice and atomic position | |

Figure 10A:
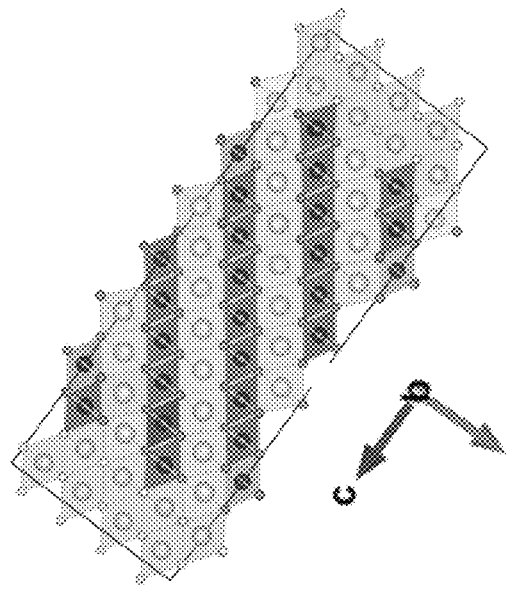
FIG. 10A to FIG. 10F are diagrams each illustrating a crystal structure of a positive electrode of one embodiment of the present invention.
Figure 10B:
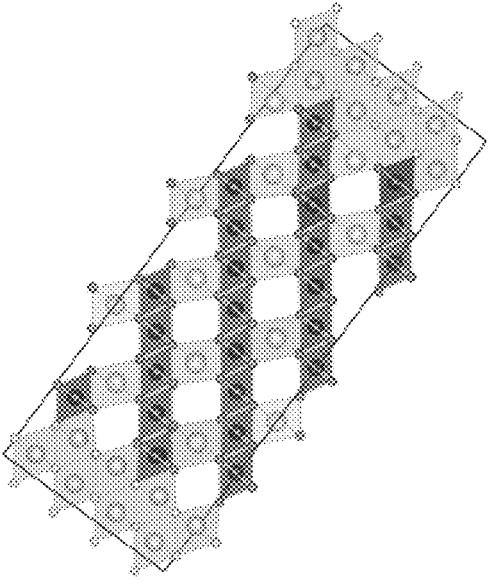
Figure 10C:
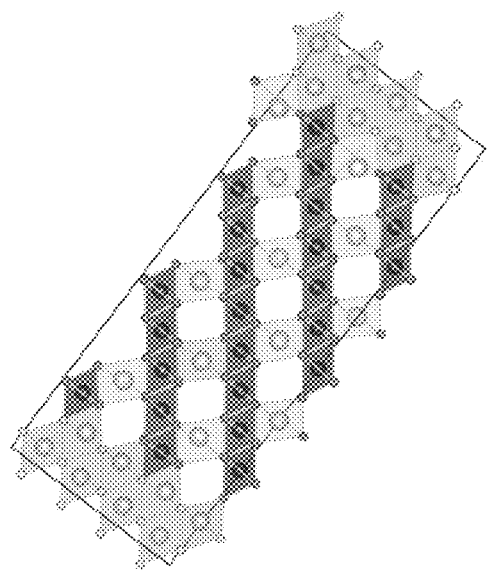
Figure 10D:
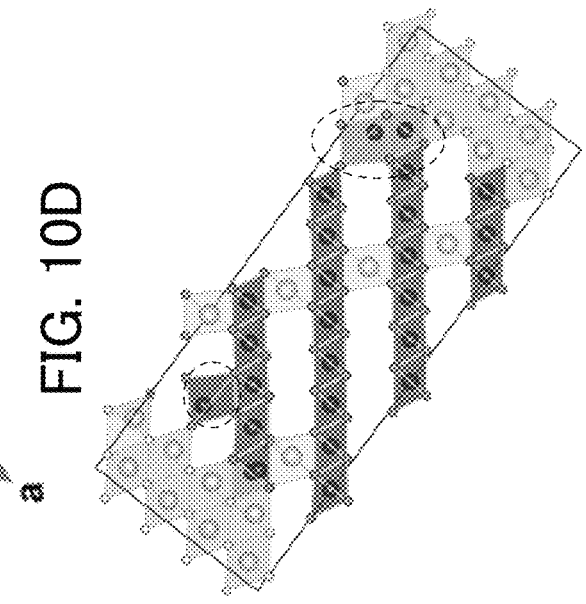
Figure 10E:
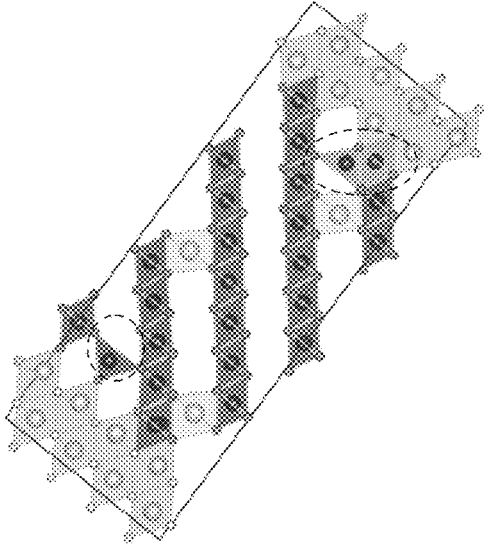
Figure 10F:
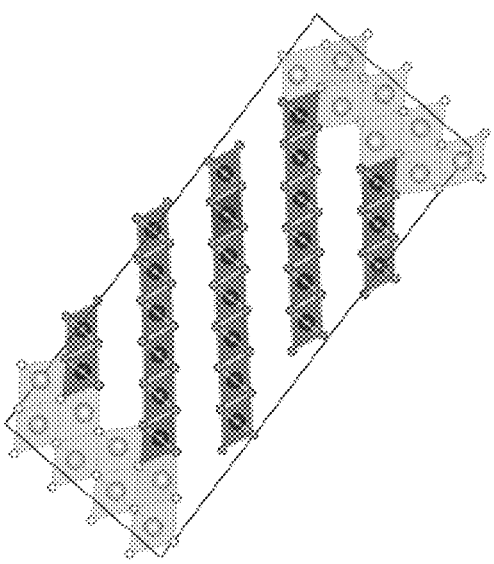

FIG. 10A is the calculation result of a depth of charge of 0 (a Li filling rate of 100%), FIG. 10B is the calculation result of a depth of charge of 0.5 (a Li filling rate of 50%), FIG. 10C is the calculation result of a depth of charge of 0.75 (a Li filling rate of 25%), FIG. 10D is the calculation result of a depth of charge of 0.875 (a Li filling rate of 12.5%), FIG. 10E is the calculation result of a depth of charge of 0.9375 (a Li filling rate of 6.25%), and FIG. 10F is the calculation result of a depth of charge of 1 (a Li filling rate of 0).

As shown in portions surrounded by dotted lines in FIG. 10D and FIG. 10E, cobalt moves to lithium sites and layers composed of $CoO_2$ octahedrons are broken in some parts at a depth of charge of 0.875 or more, while layers composed of $CoO_2$ octahedrons are kept in most of the other parts.

Therefore, in the positive electrode 100 having the stacked structure as illustrated in FIG. 9, the crystal structure of the positive electrode active material layer 101 is stable even when the depth of charge becomes deeper. Thus, the positive electrode has excellent cycle performance in which the charge and discharge capacity hardly decreases even when charging and discharging are repeated at a deep depth of charge.

[Crystal Structure of Comparative Example]

Next, as a comparative example, a positive electrode in which a stack is formed with another combination of the positive electrode active material layer 101 and the separation layer 102 is described with reference to FIG. 11A to FIG. 11E.

FIG. 11A to FIG. 11E are diagrams of the case where the positive electrode active material layer 101 contains lithium cobalt oxide and has a layered rock-salt crystal structure belonging to the space group R-3m, and the separation layer 102 contains titanium nitride and has a rock-salt crystal structure belonging to the space group Fm-3m. A stack is formed such that a (001) plane of the layered rock-salt crystal structure belonging to the space group R-3m of the positive electrode active material layer 101 is parallel to a (111) plane of a sodium chloride type crystal structure belonging to the space group Fm-3m of the separation layer 102. Optimized crystal structures are calculated at five patterns of the depth of charge: a depth of charge of 0 (a Li filling rate of 100%), a depth of charge of 0.75 (a Li filling rate of 25%), a depth of charge of 0.875 (a Li filling rate of 12.5%), a depth of charge of 0.9375 (a Li filling rate of 6.25%), and a depth of charge of 1 (a Li filling rate of 0).

FIG. 11A is the calculation result of a depth of charge of 0 (a Li filling rate of 100%), FIG. 11B is the calculation result of a depth of charge of 0.75 (a Li filling rate of 25%), FIG. 11C is the calculation result of a depth of charge of 0.875 (a Li filling rate of 12.5%), FIG. 11D is the calculation result of a depth of charge of 0.9375 (a Li filling rate of 6.25%), and FIG. 11E is the calculation result of a depth of charge of 1 (a Li filling rate of 0).

As shown in portions surrounded by dotted lines in FIG. 11B to FIG. 11E, cobalt moves to lithium sites and part of a layer composed of $CoO_2$ octahedrons is broken at a depth of charge of 0.75 or more. As compared with FIG. 10, the crystal structure starts to be broken at a shallower depth of charge in a wider region. The crystal structure tends to be broken more easily in the case where a layer composed of $CoO_2$ octahedrons is in contact with titanium nitride than in the case where a lithium layer is in contact with titanium nitride.

Therefore, the positive electrode formed of the stack including the combination of the crystal structures shown in FIG. 11 might be inferior in stability and cycle performance to the positive electrode of one embodiment of the present invention.

[Volume Change Rate]

Results of calculating volume change in positive electrodes of the following four patterns at various depths of charge (Li filling rates) are described.

(1) The positive electrode of one embodiment of the present invention illustrated in FIG. 3A. The stack is formed such that the (001) plane of lithium cobalt oxide having the layered rock-salt crystal structure belonging to the space group R-3m is parallel to the (100) plane of titanium oxide having the rutile crystal structure belonging to the space group P42/mnm (hereinafter, LCO(R-3m)\TiO$_2$).

(2) The positive electrode of one embodiment of the present invention illustrated in FIG. 9. The stack is formed such that the (104) plane of lithium cobalt oxide having the layered rock-salt crystal structure belonging to the space group R-3m is parallel to the (100) plane of titanium nitride having the rock-salt crystal structure belonging to the space group Fm-3m (hereinafter, LCO\TiN).

(3) A comparative example of a positive electrode using titanium metal for the separation layer 102. A stack is formed such that a (104) plane of lithium cobalt oxide having a layered rock-salt crystal structure belonging to the space group R-3m is parallel to a (001) plane of titanium having a hexagonal close-packed structure belonging to the space group P63/mmc (hereinafter, LCO\Ti).

(4) A comparative example of a positive electrode including no separation layer. The positive electrode includes only lithium cobalt oxide having a layered rock-salt crystal structure belonging to the space group R-3m (hereinafter, LCO).

Figure 12A:
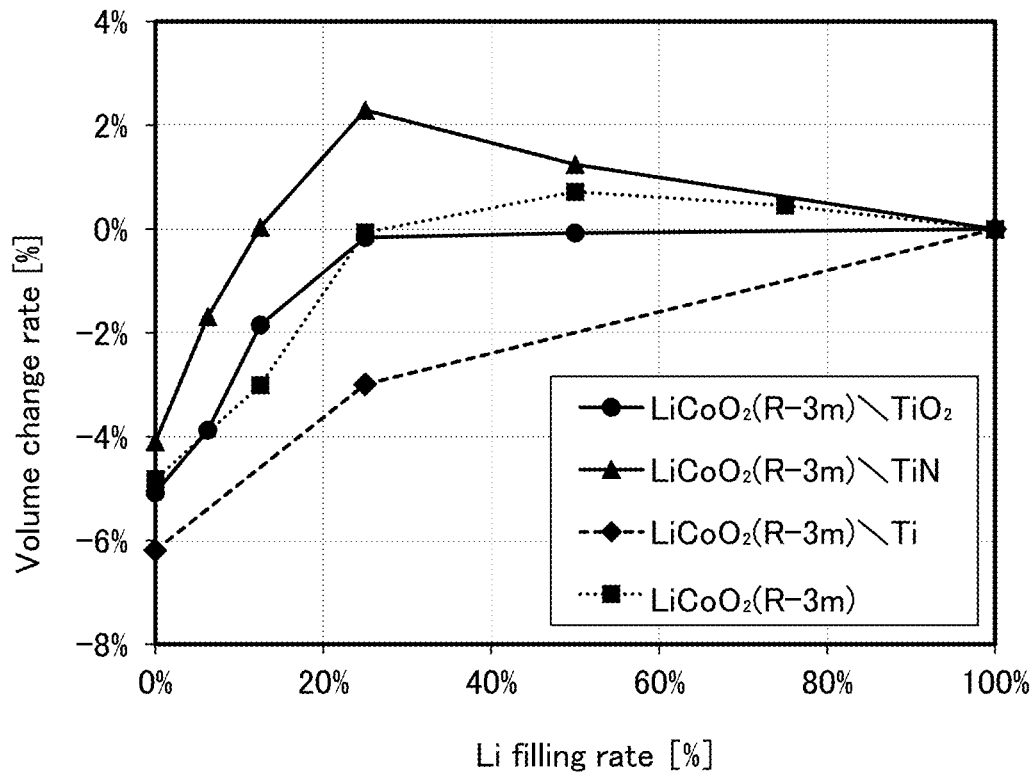
FIG. 12A is a graph showing the volume change rate of crystal structures of positive electrodes of embodiments of the present invention and positive electrodes of comparative examples.

FIG. 12A shows volume change rates with reference to the volume at a depth of charge of 0 (a Li filling rate of 100%). Regardless of the existence of the separation layer 102, the volume tends to decrease drastically at a depth of charge of 0.8 or more (a Li filling rate of 20% or less). However, at a depth of charge of 0.875 (a Li filling rate of 12.5%), LCO(R-3m)\TiO$_2$ and LCO(R-3m)\TiN, which are embodiments of the present invention, keep their volumes in a range of −2% to 1% of the reference. In particular, it is found that LCO(R-3m)\TiO$_2$ that is one embodiment of the present invention has an extremely low volume change rate at a depth of charge of greater than or equal to 0 and less than 0.8 (a Li filling rate of greater than or equal to 20% and less than or equal to 100%). Therefore, it is further suitable to use the LCO(R-3m)\TiO$_2$ structure as one embodiment of the present invention. In contrast, the volume change rates of LCO(R-3m)\Ti and LCO, which are the comparative examples, are −3% or less of the reference, which is greater change than that of one embodiment of the present invention.

[C-Axis Change Amount]

Figure 12B:
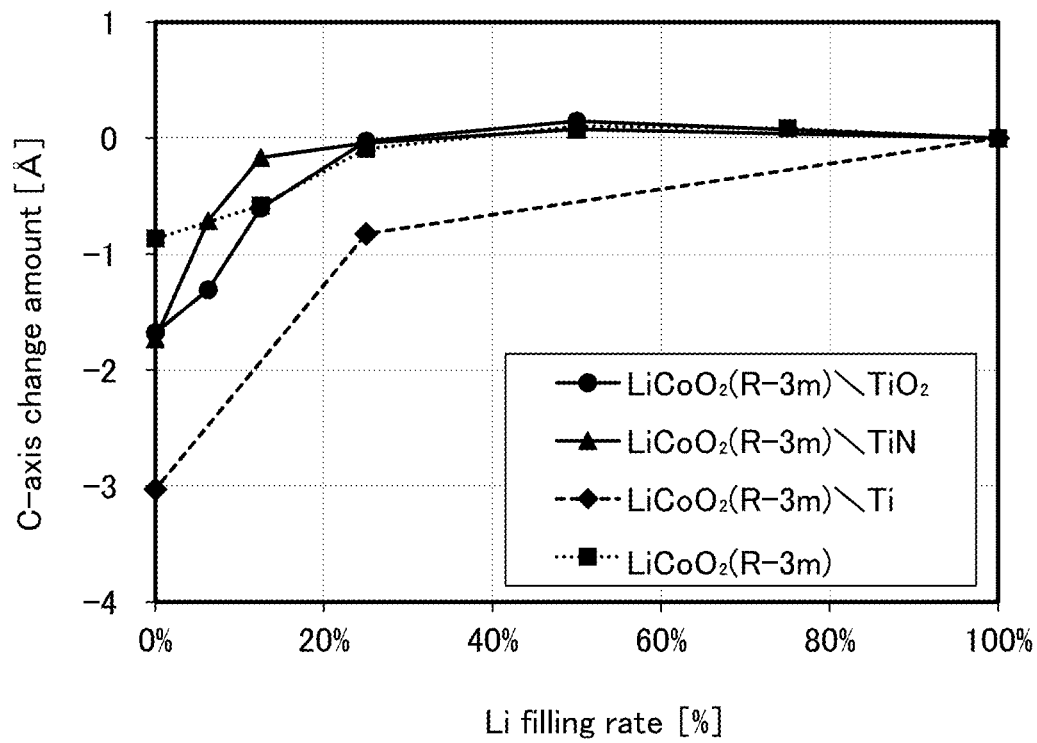
FIG. 12B is a graph showing the c-axis change amount of crystal structures of the positive electrodes of embodiments of the present invention and the positive electrodes of the comparative examples.

FIG. 12B shows calculation results of the c-axis change amount of the positive electrodes of the same four patterns as the calculation of the volume change rate. Regardless of the existence of the separation layer 102, the c-axis tends to be shortened at a depth of charge of 0.8 or more in any of the electrodes. This agrees with the tendency of the volume change rate, and thus reveals that the length in the c-axis direction contributes greatly to the volume change. Also in this case, at a depth of charge of 0.875 (a Li filling rate of 12.5%), the c-axis change amounts of LCO(R-3m)\TiO$_2$ and LCO\TiN, which are embodiments of the present invention, remain in the range of −1 Å to 0 Å from the reference. In contrast, the c-axis change amount of LCO\Ti, which is the comparative example, is as large as approximately −3 Å. Note that 1 Å=$10^{-10}$ m.

As described above, the positive electrode of one embodiment of the present invention is a stable positive electrode with a small volume change even when charging is performed at a deep depth of charge.

The positive electrode 100 of one embodiment of the present invention has the above-described crystal structure, but the whole of the positive electrode 100 does not necessarily have the above-described crystal structure. The positive electrode 100 may include another crystal structure or may be partly amorphous. The crystal structure of the positive electrode 100 described in this embodiment can be estimated by XRD. Note that the crystal structure might not be strictly as described above and is a distorted crystal structure in some cases. The crystal planes mentioned in this embodiment indicate only plane orientations and do not accurately limit the interplanar spacing.

This embodiment can be implemented in appropriate combination with the other embodiments.

Embodiment 2

In this embodiment, a secondary battery including the positive electrode for a secondary battery described in Embodiment 1, and a manufacturing method of the secondary battery are described.

[Structure of Secondary Battery]

Figure 13A:
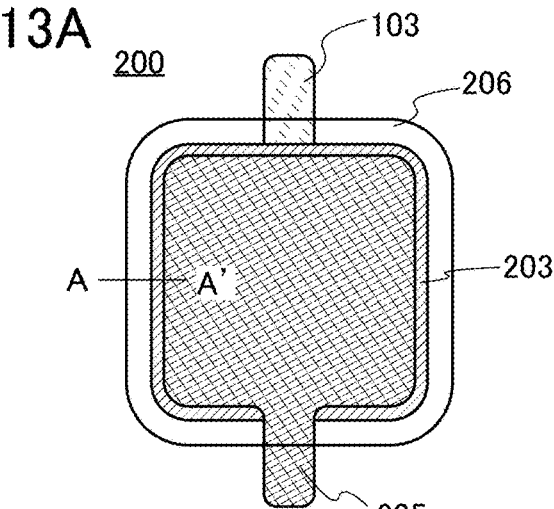
FIG. 13A is a top view illustrating one embodiment of the present invention and FIG. 13B to FIG. 13D are cross-sectional views each illustrating the one embodiment of the present invention.
Figure 13B:
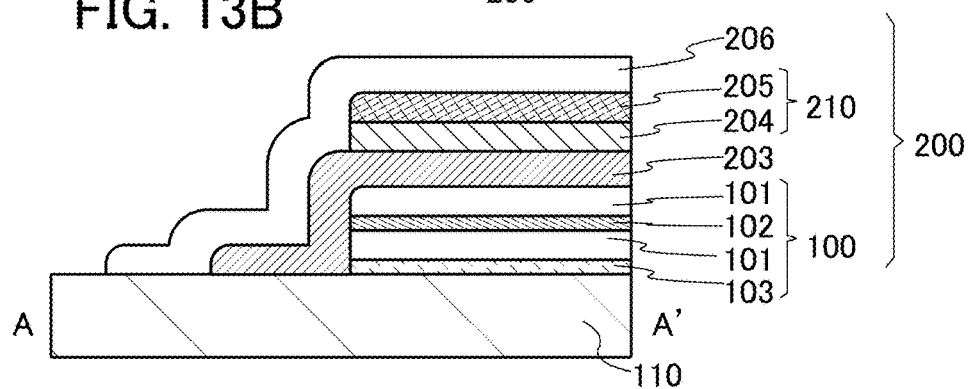

FIG. 13A and FIG. 13B illustrate a secondary battery 200 that is an example of a secondary battery of one embodiment of the present invention. FIG. 13A is a top view, and FIG. 13B is a cross-sectional view taken along a line A-A' in FIG. 13A.

The secondary battery 200 is a thin-film battery, in which the positive electrode 100 described in the above embodiment is formed over the substrate 110, a solid electrolyte layer 203 is formed over the positive electrode 100, and a negative electrode 210 is formed over the solid electrolyte layer 203 as illustrated in FIG. 13B. FIG. 13B illustrates the case where the positive electrode 100 includes two positive electrode active material layers 101 and one separation layer 102 therebetween over the positive electrode current collector layer 103 (i.e., the case where n=2). The negative electrode 210 includes a negative electrode active material layer 204 and a negative electrode current collector layer 205. In addition, a protective layer 206 is preferably formed over the positive electrode 100, the solid electrolyte layer 203, and the negative electrode 210 in the secondary battery 200.

Each of films forming these layers can be formed using a metal mask. The positive electrode current collector layer 103, the positive electrode active material layer 101, the separation layer 102, the solid electrolyte layer 203, the negative electrode active material layer 204, the negative electrode current collector layer 205, and the protective layer 206 can be selectively formed by a sputtering method. Furthermore, the solid electrolyte layer 203 may be selectively formed using a metal mask by a co-evaporation method.

As illustrated in FIG. 13A, part of the negative electrode current collector layer 205 can be exposed to form a negative electrode terminal portion. In addition, part of the positive electrode current collector layer 103 can be exposed to form a positive electrode terminal portion. It is preferable that the protective layer 206 cover a region other than the negative electrode terminal portion and the positive electrode terminal portion.

Although FIG. 13A and FIG. 13B illustrate the structure in which the solid electrolyte layer 203, the negative electrode active material layer 204, and the negative electrode current collector layer 205 are sequentially stacked over the positive electrode 100 including the positive electrode current collector layer 103, the positive electrode active material layer 101, and the separation layer 102, one embodiment of the present invention is not limited to this.

Figure 13C:
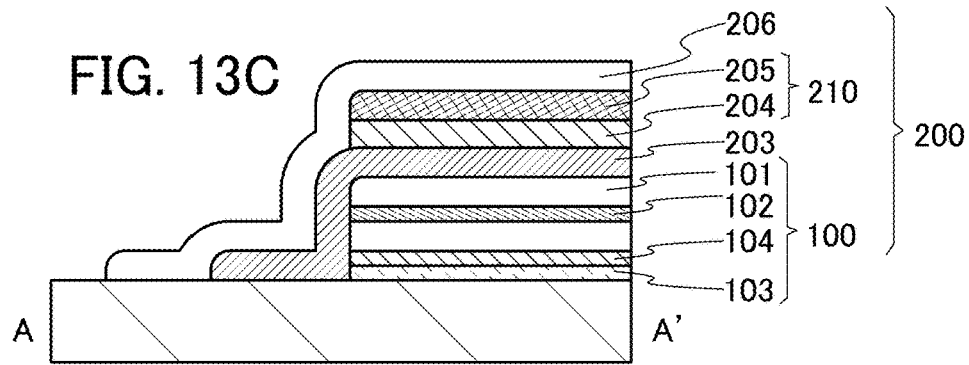

As illustrated in FIG. 13C, the secondary battery 200 may include the positive electrode 100 including a base film 104 between the positive electrode current collector layer 103 and the positive electrode active material layer 101. The base film 104 preferably has a high crystallinity and a function of controlling the orientation in the positive electrode active material layer 101. The same material as that of the separation layer 102 can be used as the material of the base film 104.

Figure 13D:
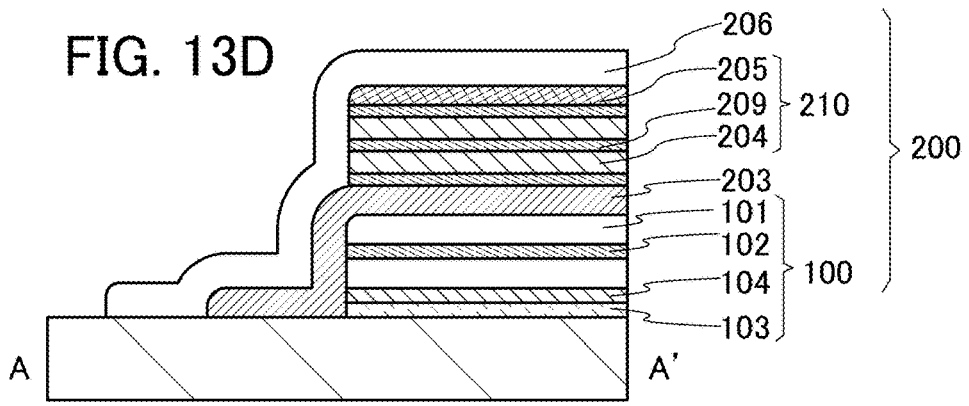

The negative electrode included in the secondary battery of one embodiment of the present invention may have a stacked structure including an active material layer and a separation layer like the positive electrode. For example, as illustrated in FIG. 13D, the secondary battery 200 may include the negative electrode 210 including m negative electrode active material layers 204 and m+1 separation layers 209. Note that m is an integer greater than or equal to 2. FIG. 13D is a diagram of the case where m=2. As illustrated in FIG. 13D, the negative electrode 210 preferably includes the separation layers 209 between the negative electrode active material layer 204 and the negative electrode current collector layer 205 and between the negative electrode active material layer 204 and the solid electrolyte layer 203.

The description of the separation layer 102 can be referred to for the material and the formation method of the separation layer 209. The negative electrode 210 including the separation layer 209 is a negative electrode which has a small volume change even when occluding lithium ions and has excellent cycle performance in which a crack or a breakage does not easily occur.

Figure 14A:
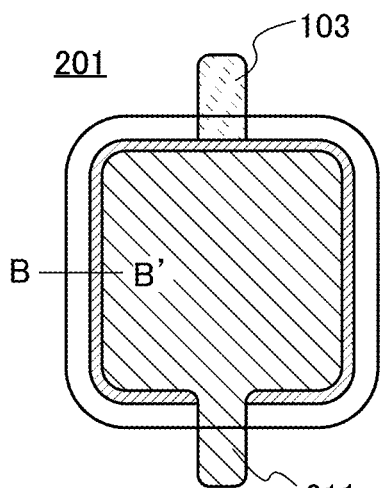
FIG. 14A and FIG. 14C are top views each illustrating one embodiment of the present invention and FIG. 14B and FIG. 14D are cross-sectional views each illustrating the one embodiment of the present invention.
Figure 14B:
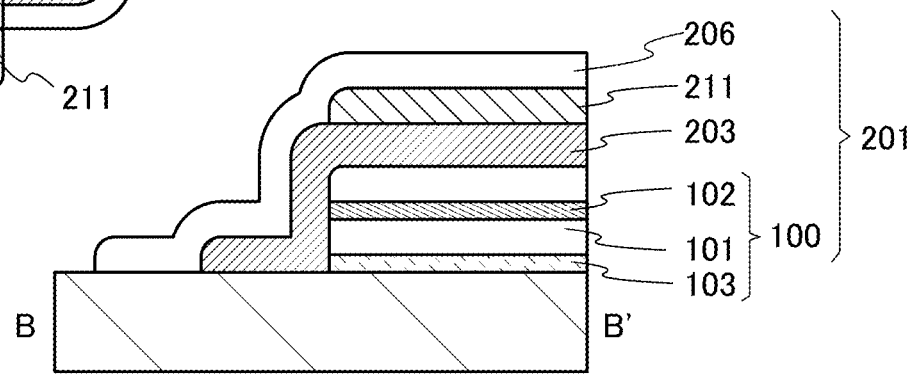

As illustrated in FIG. 14A and FIG. 14B, the secondary battery of one embodiment of the present invention may be a secondary battery 201 including a negative electrode 211 serving as both a negative electrode current collector layer and a negative electrode active material layer. FIG. 14A is a top view of the secondary battery 201 and FIG. 14B is a cross-sectional view taken along a line B-B' in FIG. 14A. With the negative electrode 211 serving as both a negative electrode current collector layer and a negative electrode active material layer, the secondary battery can be manufactured through a simplified process with high productivity. Moreover, the secondary battery can have high energy density.

Figure 14C:
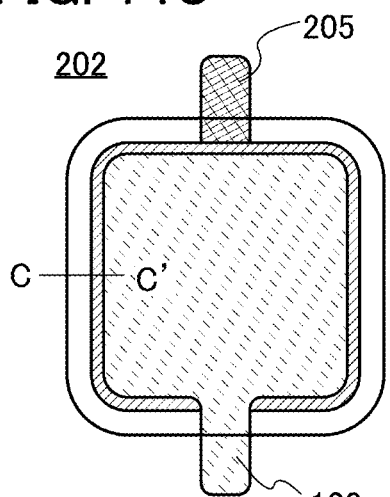
Figure 14D:
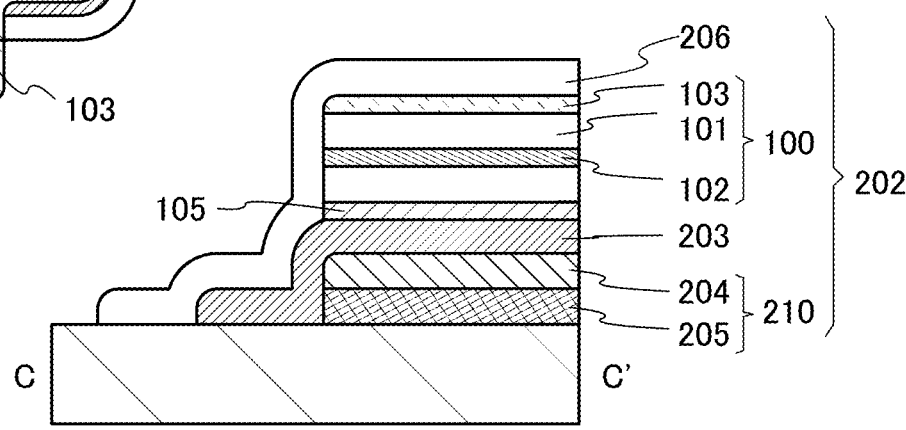

Although the secondary battery in which the positive electrode 100, the solid electrolyte layer 203, and the negative electrode 210 are formed in this order over a substrate is described above, one embodiment of the present invention is not limited to this. As illustrated in FIG. 14C and FIG. 14D, the secondary battery of one embodiment of the present invention may be a secondary battery 202 in which the solid electrolyte layer 203 and the positive electrode 100 are stacked over the negative electrode 210. In this case, the positive electrode 100 preferably includes the cap layer 105. FIG. 14C is a top view of the secondary battery 202 and FIG. 14D is a cross-sectional view taken along a line C-C' in FIG. 14C.

Although the secondary battery in which not only the positive electrode but also the solid electrolyte layer and the negative electrode are formed of thin films is described above, one embodiment of the present invention is not limited to this. One embodiment of the present invention may be a secondary battery including an electrolyte solution. Alternatively, one embodiment of the present invention may be a secondary battery including an electrolyte solution and a negative electrode serving as both a negative electrode current collector layer and a negative electrode active material layer. Alternatively, one embodiment of the present invention may be a secondary battery including a negative electrode formed by coating a negative electrode current collector with powder of a negative electrode active material.

Figure 15A:
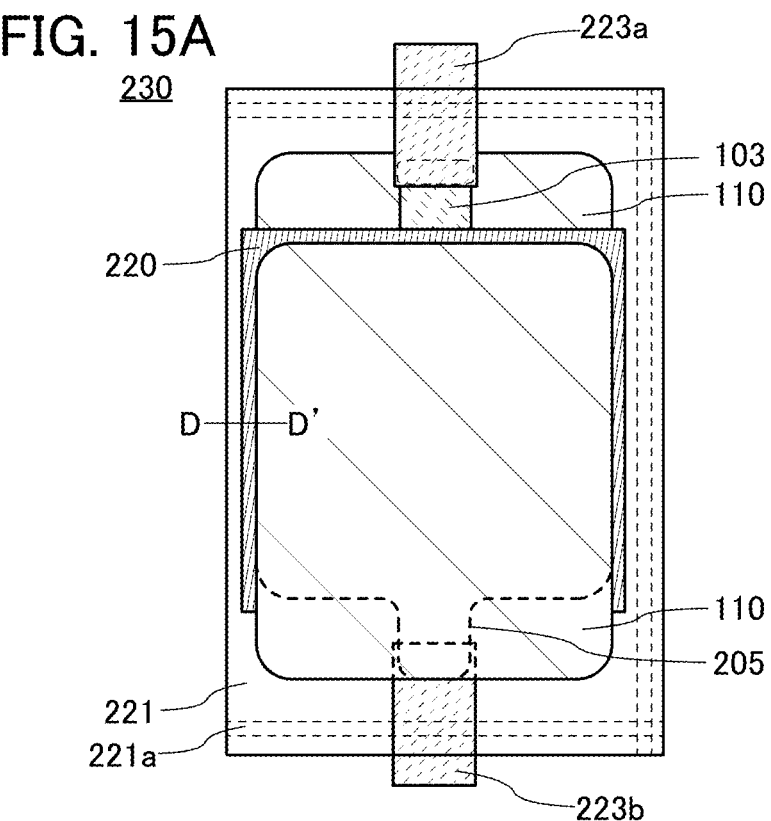
FIG. 15A is a top view illustrating one embodiment of the present invention and FIG. 15B is a cross-sectional view illustrating one embodiment of the present invention.
Figure 15B:
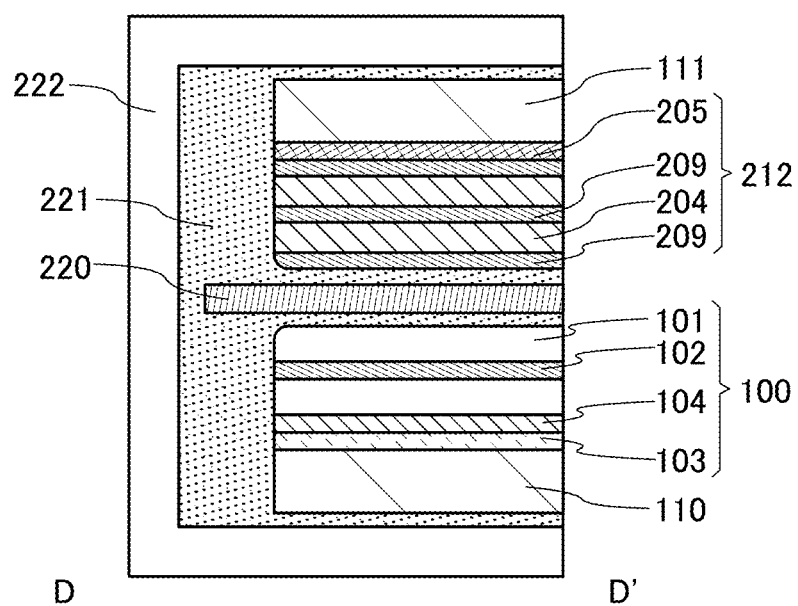

FIG. 15A and FIG. 15B illustrate a secondary battery 230 including an electrolyte solution. FIG. 15A is a top view, and FIG. 15B is a cross-sectional view taken along a line D-D' in FIG. 15A.

As illustrated in FIG. 15B, the secondary battery 230 includes the positive electrode 100 over the substrate 110, a negative electrode 212 over a substrate 111, a separator 220, an electrolyte solution 221, and an exterior body 222. The negative electrode current collector layer 205, the negative electrode active material layer 204, and the separation layer 209 included in the negative electrode 212 are formed of thin films.

In addition, as illustrated in FIG. 15A, the secondary battery 230 includes a lead electrode 223a and a lead electrode 223b. The lead electrode 223a is electrically connected to the positive electrode current collector layer 103. The lead electrode 223b is electrically connected to the negative electrode current collector layer 205. The lead electrode 223a and the lead electrode 223b are partly led to the outside of the exterior body 222.

Figure 16A:
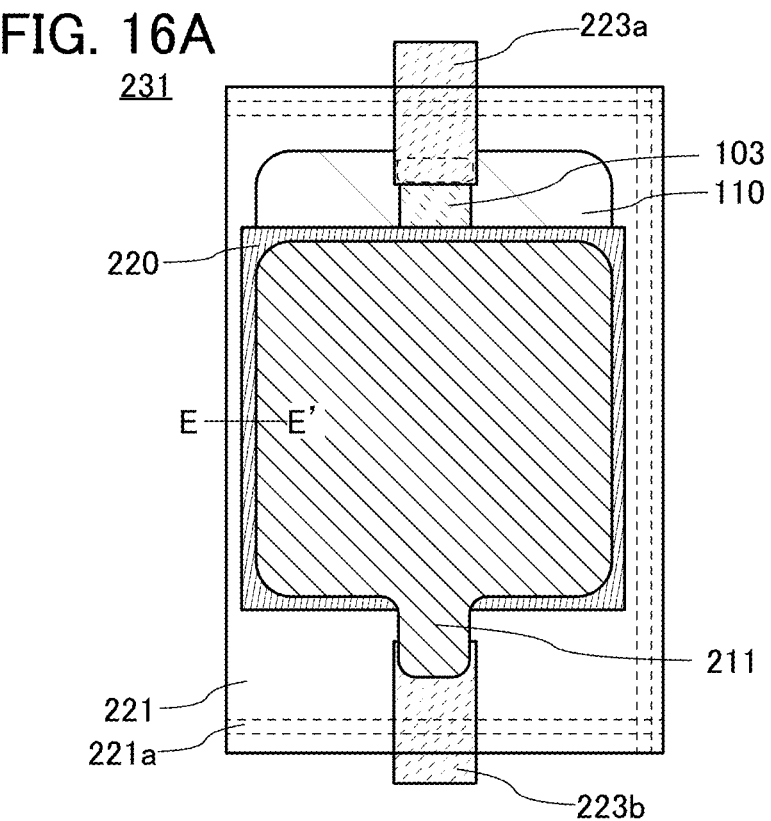
FIG. 16A is a top view illustrating one embodiment of the present invention and FIG. 16B is a cross-sectional view illustrating one embodiment of the present invention.
Figure 16B:
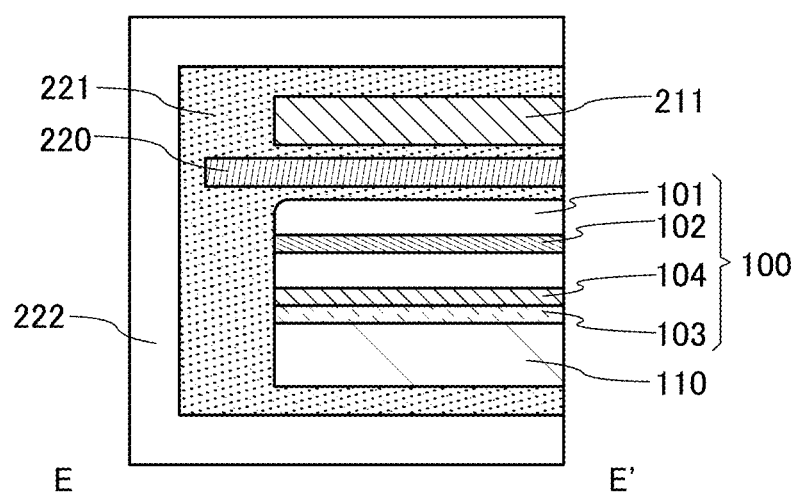

FIG. 16A and FIG. 16B illustrate a secondary battery 231 including an electrolyte solution and the negative electrode 211 serving as both a negative electrode current collector layer and a negative electrode active material layer. FIG. 16A is a top view, and FIG. 16B is a cross-sectional view taken along a line E-E' in FIG. 16A.

As illustrated in FIG. 16B, the secondary battery 231 includes the positive electrode 100 over the substrate 110, the negative electrode 211 serving as both a negative electrode current collector layer and a negative electrode active material layer, the separator 220, the electrolyte solution 221, and the exterior body 222. With the negative electrode 211 serving as both a negative electrode current collector layer and a negative electrode active material layer, the secondary battery can be manufactured through a simplified process with high productivity. Moreover, the secondary battery can have high energy density.

[Manufacturing Method]

Figure 17:
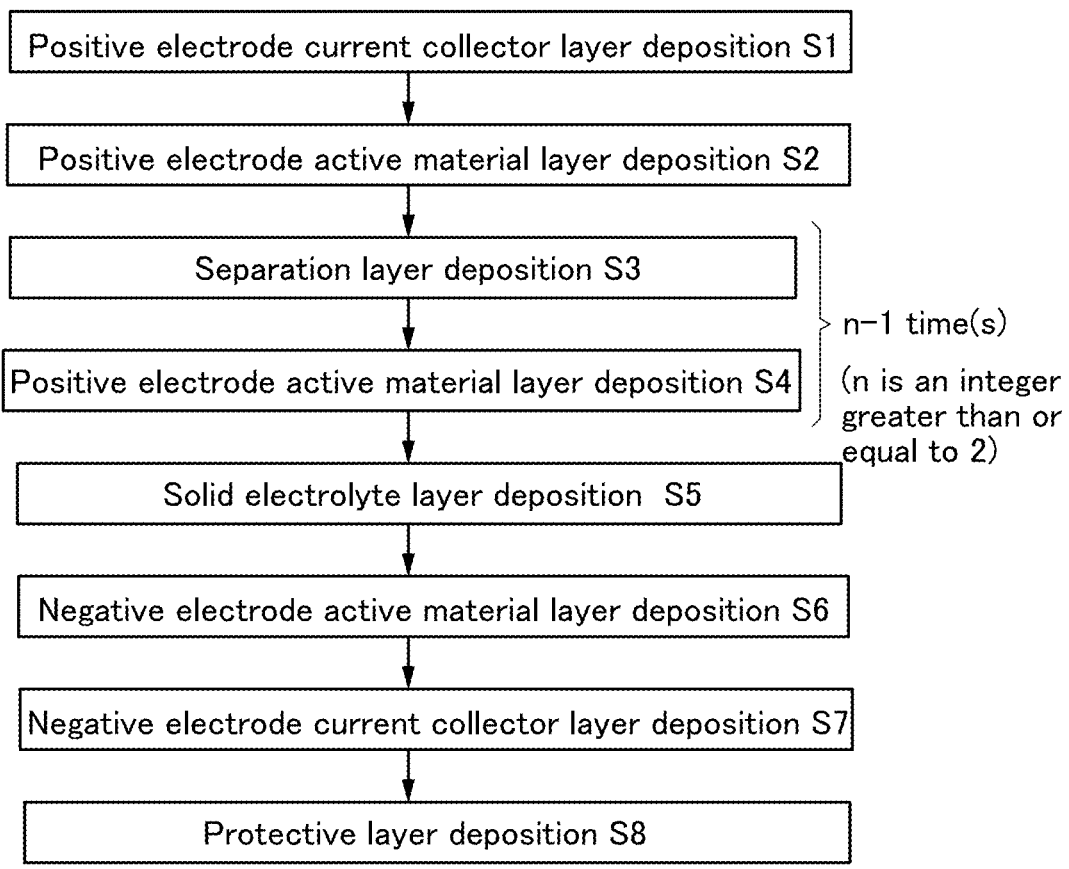
FIG. 17 is a diagram showing a manufacturing flow of a secondary battery of one embodiment of the present invention.

Next, a flow example of a manufacturing method of the secondary battery 200 illustrated in FIG. 13A and FIG. 13B is described with reference to FIG. 17.

First, the positive electrode current collector layer 103 is formed over the substrate 110 (S1). As a deposition method, a sputtering method, an evaporation method, or the like can be used. A substrate having conductivity may be used as a current collector.

As the substrate 110, a ceramic substrate, a glass substrate, a resin substrate, a silicon substrate, a metal substrate, or the like can be used. When a flexible material is used for the substrate 110, a flexible thin-film secondary battery can be manufactured.

Next, the positive electrode active material layer 101 is deposited (S2). The positive electrode active material layer 101 can be deposited by a sputtering method using a sputtering target containing, as a main component, an oxide containing lithium and one or more of manganese, cobalt, and nickel. For example, a sputtering target containing a lithium cobalt oxide ($LiCoO_2$, $LiCo_2O_4$, or the like) as a main component, a sputtering target containing a lithium manganese oxide ($LiMnO_2$, $LiMn_2O_4$, or the like) as a main component, or a sputtering target containing a lithium nickel oxide ($LiNiO_2$, $LiNi_2O_4$, or the like) as a main component can be used. Alternatively, the positive electrode active material layer 101 may be deposited by a vacuum evaporation method.

In a sputtering method, with use of a metal mask, deposition can be selectively performed. Alternatively, the positive electrode active material layer 101 may be patterned by being selectively removed by dry etching or wet etching using a resist mask or the like.

At this time, the deposition is preferably performed such that a (104) plane of a layered rock-salt crystal structure belonging to the space group R-3m of the positive electrode active material layer 101 is parallel to the substrate 110. To achieve this, it is preferable to adjust the crystal orientation of the substrate 110, deposition conditions (e.g., output, the atmosphere such as the oxygen partial pressure, and temperature), the magnetic field, and the like.

Furthermore, in order to deposit the positive electrode active material layer 101 containing magnesium, fluorine, aluminum, or the like, a sputtering target containing magnesium, fluorine, aluminum, or the like in addition to lithium and one or more of manganese, cobalt, and nickel may be used for the deposition. Alternatively, magnesium, fluorine, aluminum, or the like may be deposited by a vacuum vapor deposition method and annealing may be performed after the deposition is performed using a sputtering target containing, as a main component, an oxide containing lithium and one or more of manganese, cobalt, and nickel.

Next, the separation layer 102 is deposited over the positive electrode active material layer 101 (S3). As a deposition method of the separation layer 102, a sputtering method, an evaporation method, or the like can be used.

For example, in the case where titanium nitride is used for the separation layer 102, titanium nitride can be deposited by a reactive sputtering method using a titanium target and a nitrogen gas. In the case where the separation layer 102 has a crystal structure belonging to the space group Fm-3m like titanium nitride, deposition is preferably performed such that a (100) plane of the separation layer 102 is parallel to the (104) plane of the layered rock-salt crystal structure belonging to the space group R-3m of the positive electrode active material layer 101. To achieve this, it is preferable to adjust deposition conditions (e.g., output, the atmosphere such as the oxygen partial pressure, and temperature), the magnetic field, and the like.

In the case where titanium oxide is used for the separation layer 102, for example, titanium nitride can be deposited by a reactive sputtering method using a titanium target and an oxygen gas. In the case where the separation layer 102 has a crystal structure belonging to the space group P42/mnm like titanium oxide, deposition is preferably performed such that a (100) plane of the separation layer 102 is parallel to the (104) plane of the layered rock-salt crystal structure belonging to the space group R-3m of the positive electrode active material layer 101. To achieve this, it is preferable to adjust deposition conditions (e.g., output, the atmosphere such as the oxygen partial pressure, and temperature), the magnetic field, and the like.

Next, the positive electrode active material layer 101 is deposited again over the separation layer 102 (S4).

S3 and S4 are each performed n−1 time(s) (n is an integer greater than or equal to 2). In this manner, a positive electrode including n positive electrode active material layers (n is an integer greater than or equal to 2) and n−1 separation layer(s) can be formed.

The positive electrode active material layer 101 and the separation layer 102 are preferably deposited at high temperatures (500° C. or higher, preferably 600° C. or higher). Alternatively, annealing treatment (at 500° C. or higher, preferably 600° C. or higher) is preferably performed after the positive electrode active material layer 101 and the separation layer 102 are deposited. With such a manufacturing method, the positive electrode 100 with further favorable crystallinity can be formed.

Next, the solid electrolyte layer 203 is deposited over the positive electrode active material layer 101 (S5). Examples of materials for the solid electrolyte layer include $Li_3PO_4$, $Li_4PO_{(4-B)}N_y$, $Li_{0.35}La_{0.55}TiO_3$, $La_{(2/3-x)}Li_{3A}TiO_3$, $LiNb_{(1-A)}Ta_{(A)}WO_6$, $Li_7La_3Zr_2O_{12}$, $Li_{(1+A)}Al_{(A)}Ti_{(2-A)}(PO_4)_3$, $Li_{(1+A)}Al_{(A)}Ge_{(2-A)}(PO_4)_3$, and $LiNbO_2$. Note that A>0 and B>0. As a deposition method, a sputtering method, an evaporation method, or the like can be used. In addition, $SiO_C$ (0<C<2) can also be used for the solid electrolyte layer 203. $SiO_C$ (0<C<2) may be used for the solid electrolyte layer 203, and $SiO_C$ (0<C<2) may also be used for the negative electrode active material layer 204. In this case, the ratio of oxygen to silicon (O/Si) in $SiO_C$ is preferably higher in the solid electrolyte layer 203 than in the negative electrode active material layer 204. With this structure, conductive ions (particularly lithium ions) in the solid electrolyte layer 203 are likely to diffuse, and conductive ions (particularly lithium ions) in the negative electrode active material layer 204 are likely to be extracted or accumulated, whereby a solid-state secondary battery with favorable characteristics can be obtained. When the solid electrolyte layer 203 and the negative electrode active material layer 204 are formed using materials containing the same components as described above, a secondary battery can be manufactured easily.

The solid electrolyte layer 203 may have a stacked-layer structure. In the case of a stacked-layer structure, a material to which nitrogen is added to lithium phosphate ($Li_3PO_4$) (the material is also referred to as $Li_3PO_{(4-Z)}N_Z$:LiPON) may be stacked as one layer. Note that Z>0.

It is preferable to use a compound containing titanium for the solid electrolyte layer 203. Since the separation layer 102 included in the positive electrode 100 contains titanium, the secondary battery can be manufactured easily with the use of a material containing titanium also for the solid electrolyte layer 203.

Next, the negative electrode active material layer 204 is deposited over the solid electrolyte layer 203 (S6). The negative electrode active material layer 204 can be a film containing silicon as a main component, a film containing carbon as a main component, a titanium oxide film, a vanadium oxide film, an indium oxide film, a zinc oxide film, a tin oxide film, a nickel oxide film, or the like which is formed by a sputtering method or the like. A film of tin, gallium, aluminum, or the like which is alloyed with Li can be used. Alternatively, a metal oxide film of any of these which are alloyed with Li may be used. A lithium titanium oxide ($Li_4Ti_5O_{12}$, $LiTi_2O_4$, or the like) may be used; in particular, a film containing silicon and oxygen is preferable. A Li metal film may also be used as the negative electrode active material layer 204. The Li metal film can also be used as a negative electrode serving as both a negative electrode current collector layer and a negative electrode active material layer.

Next, the negative electrode current collector layer 205 is formed over the negative electrode active material layer 204 (S7). As a material of the negative electrode current collector layer 205, one or more kinds of conductive materials selected from Al, Ti, Cu, Au, Cr, W, Mo, Ni, Ag, and the like are used. As a deposition method, a sputtering method, an evaporation method, or the like can be used. In a sputtering method, with use of a metal mask, deposition can be selectively performed. A conductive film may be patterned by being selectively removed by dry etching or wet etching using a resist mask or the like.

In the case where the positive electrode current collector layer 103 or the negative electrode current collector layer 205 is formed by a sputtering method, at least one of the positive electrode active material layer 101 and the negative electrode active material layer 204 is preferably formed by a sputtering method. A sputtering apparatus is capable of successive film deposition in one chamber or using a plurality of chambers and can also be a multi-chamber manufacturing apparatus or an in-line manufacturing apparatus. A sputtering method is a manufacturing method suitable for mass production that uses a chamber and a sputtering target. In addition, a sputtering method enables thin formation and thus excels in a film deposition property.

Next, the protective layer 206 is preferably deposited over the positive electrode 100, the solid electrolyte layer 203, and the negative electrode 210 (S8). A metal oxide containing one kind or two or more kinds selected from hafnium, aluminum, gallium, yttrium, zirconium, tungsten, titanium, tantalum, nickel, germanium, neodymium, lanthanum, magnesium, and the like can be used for the protective layer 206. Alternatively, silicon nitride oxide, silicon nitride, or the like can be used. The protective layer 206 can be deposited by a sputtering method.

For film deposition of each layer described in this embodiment, a gas phase method (a vacuum evaporation method, a thermal spraying method, a pulsed laser deposition method (a PLD method), an ion plating method, a cold spray method, or an aerosol deposition method) can also be used without limitation to a sputtering method. Note that an aerosol deposition (AD) method is a method in which deposition is performed without heating a substrate. The aerosol means microparticles dispersed in a gas. Alternatively, a CVD method or an ALD (Atomic layer Deposition) method may be used.

Through the above steps, the secondary battery 200 of one embodiment of the present invention can be manufactured.

This embodiment can be implemented in appropriate combination with the other embodiments.

Embodiment 3

In order to increase the output voltage of a thin-film secondary battery, secondary batteries can be connected in series. While the example of the secondary battery of the single cell is described in Embodiment 2, an example of manufacturing thin-film secondary batteries in which a plurality of cells are connected in series is described in this embodiment.

FIG. 18A is a top view right after formation of a first secondary battery, and FIG. 18B is a top view of two secondary batteries connected in series. In FIG. 18A and FIG. 18B, the same portions as the portions in FIG. 13A described in Embodiment 2 are denoted by the same reference numerals.

FIG. 18A illustrates the state right after deposition of the negative electrode current collector layer 205. The shape of the top surface of the negative electrode current collector layer 205 is different from that in FIG. 13A. The negative electrode current collector layer 205 illustrated in FIG. 18A is partly in contact with the side surface of the solid electrolyte layer and is also in contact with an insulating surface of the substrate.

Then, a second negative electrode active material layer is formed over a region which is in the negative electrode current collector layer 205 and does not overlap with a first negative electrode active material layer, as illustrated in FIG. 18B. Then, a second solid electrolyte layer 213 is formed, and a second positive electrode active material layer and a second positive electrode current collector layer 215 are formed thereover. Lastly, the protective layer 206 is formed.

FIG. 18B illustrates a structure in which two solid-state secondary batteries are arranged on a plane and connected in series.

This embodiment can be implemented in appropriate combination with the other embodiments.

Embodiment 4

A plurality of positive electrodes and a plurality of negative electrodes can be stacked to form a multi-layer secondary battery to increase an output voltage or a discharge capacity of a thin-film secondary battery. While the example of the secondary battery of the single-layer cell is described in Embodiment 2, an example of a thin-film battery of a multi-layer cell is described in this embodiment.

Figure 19:
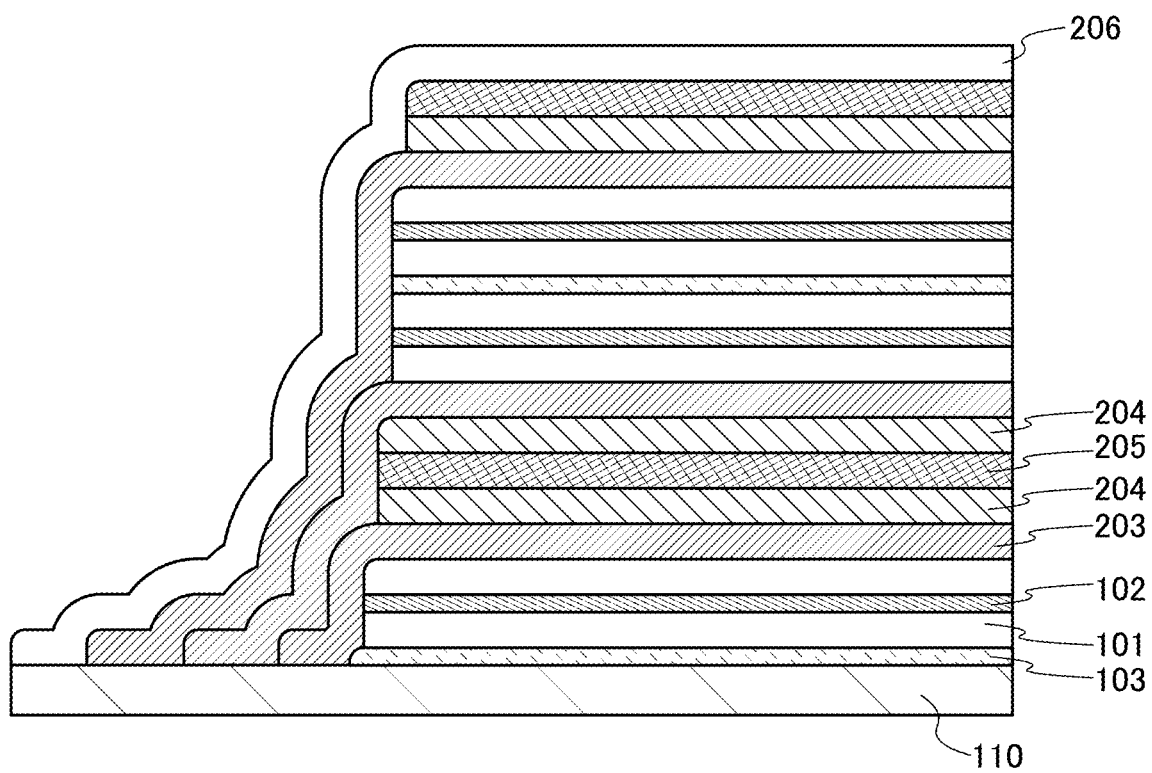
FIG. 19 is a cross-sectional view illustrating one embodiment of the present invention.

FIG. 19 is an example of a cross section of a thin-film battery of a three-layer cell. A first cell is formed in such a manner that the positive electrode current collector layer 103 is formed over the substrate 110, and the positive electrode active material layer 101, the separation layer 102, the positive electrode active material layer 101, the solid electrolyte layer 203, the negative electrode active material layer 204, and the negative electrode current collector layer 205 are sequentially formed over the positive electrode current collector layer 103.

Furthermore, a second cell is formed in such a manner that a second negative electrode active material layer 204, a second solid electrolyte layer, a second positive electrode active material layer, a second separation layer, a second positive electrode active material layer, and a second positive electrode current collector layer are sequentially formed over the negative electrode current collector layer 205.

Moreover, a third cell is formed in such a manner that a third positive electrode active material layer, a third separation layer, a third positive electrode active material layer, a third solid electrolyte layer, a third negative electrode active material layer, and a third negative electrode current collector layer are sequentially formed over the second positive electrode current collector layer.

Lastly, the protective layer 206 is formed in FIG. 19. The three-layer stack illustrated in FIG. 19 has a structure of series connection in order to increase the capacity but can be connected in parallel with an external wiring. Series connection, parallel connection, or series-parallel connection can also be selected with an external wiring.

Note that the solid electrolyte layer 203, the second solid electrolyte layer, and the third solid electrolyte layer are preferably formed using the same material, leading to a reduction in the manufacturing cost.

Figure 20:
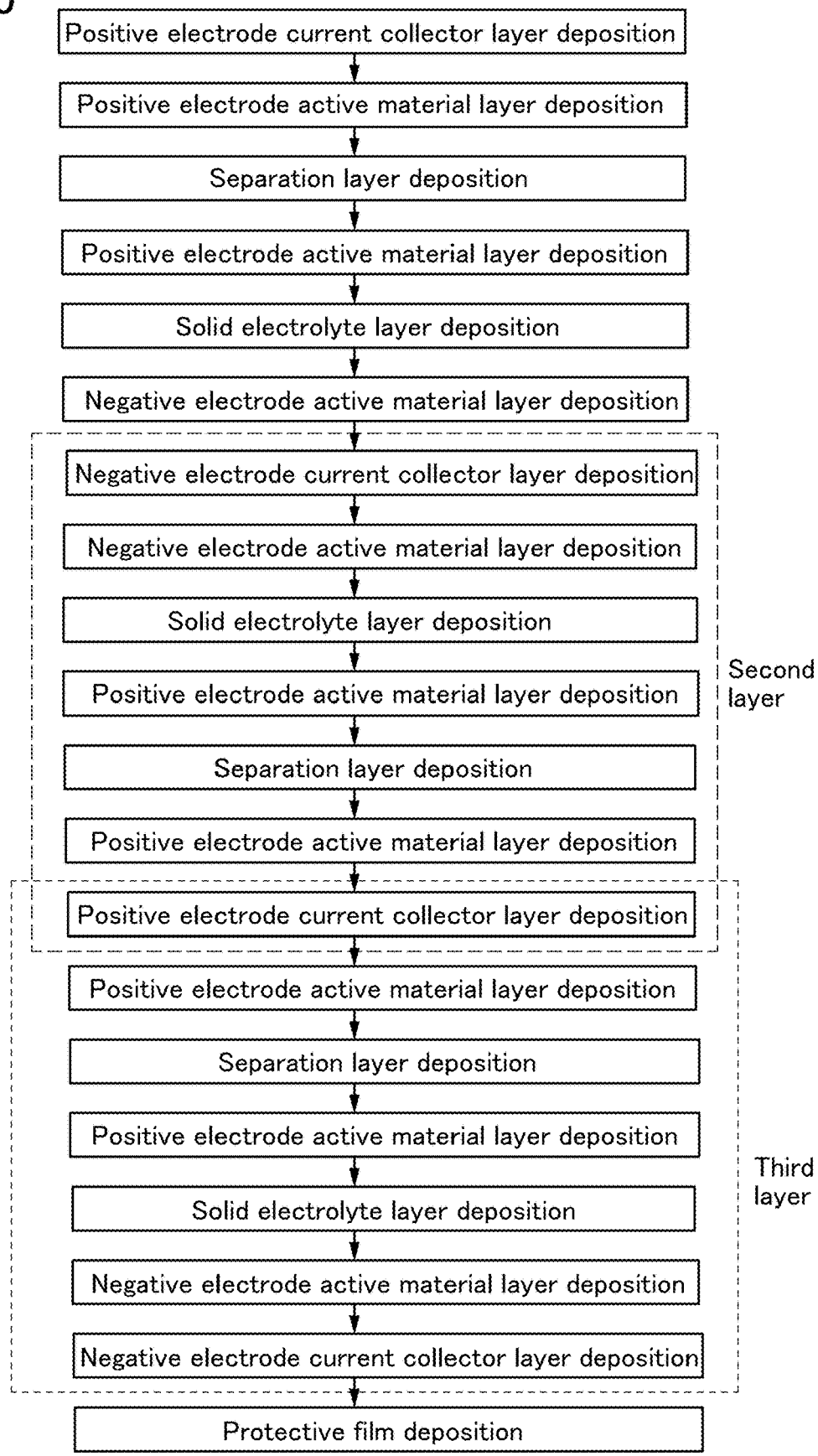
FIG. 20 is a diagram showing a manufacturing flow of a secondary battery of one embodiment of the present invention.

FIG. 20 shows an example of a manufacturing flow for obtaining the structure illustrated in FIG. 19.

To reduce the number of manufacturing steps, in FIG. 20, it is preferable to use a lithium cobalt oxide film for the positive electrode active material layer and to use a titanium film for the positive electrode current collector layer and the negative electrode current collector layer (conductive layer). The use of the titanium film as a common electrode allows a three-layer stacked cell with a small number of components to be achieved.

This embodiment can be implemented in appropriate combination with the other embodiments.

Embodiment 5

Figure 21:
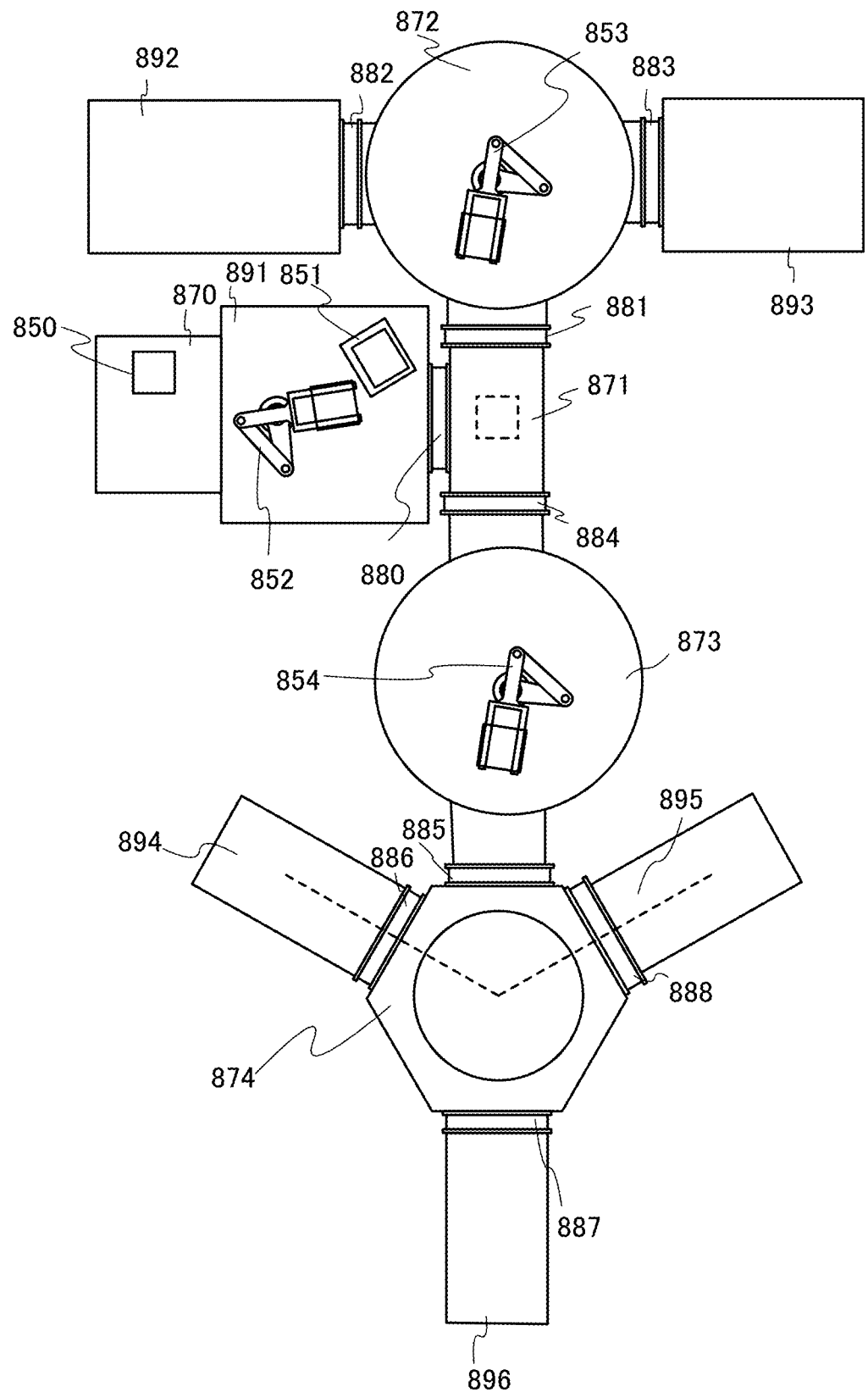
FIG. 21 is a schematic top view of a manufacturing apparatus for a secondary battery.
Figure 22:
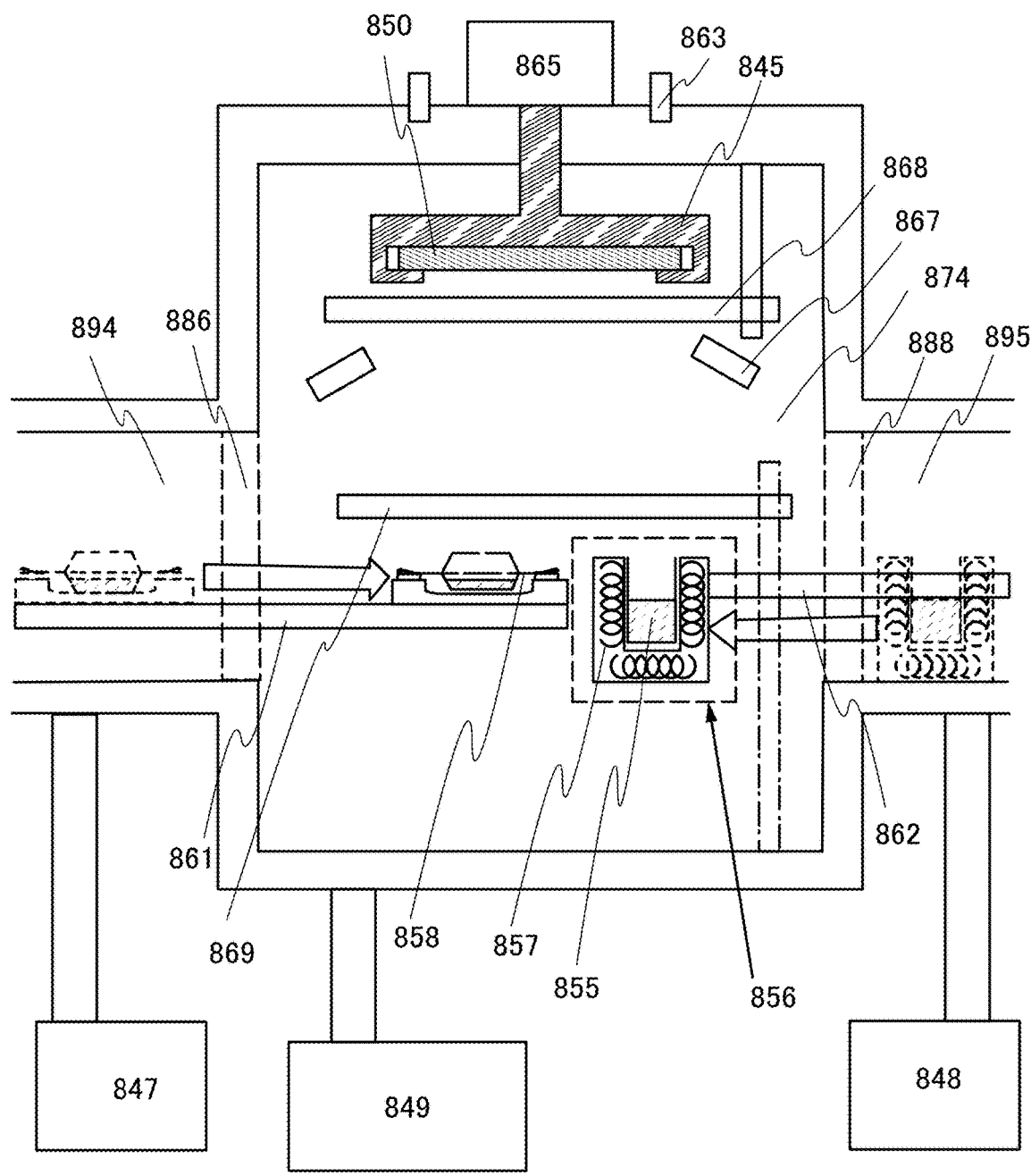
FIG. 22 is a cross-sectional view of part of a manufacturing apparatus for a secondary battery.

In this embodiment, FIG. 21 and FIG. 22 illustrate an example of a multi-chamber manufacturing apparatus capable of totally automating the manufacture from a positive electrode current collector layer to a negative electrode current collector layer in a secondary battery. The manufacturing apparatus can be suitably used for manufacturing the thin-film secondary battery of one embodiment of the present invention.

FIG. 21 illustrates an example of a multi-chamber manufacturing apparatus that includes gates 880, 881, 882, 883, 884, 885, 886, 887, and 888, a load lock chamber 870, a mask alignment chamber 891, a first transfer chamber 871, a second transfer chamber 872, a third transfer chamber 873, a plurality of deposition chambers (a first deposition chamber 892 and a second deposition chamber 874), a heating chamber 893, a second material supply chamber 894, a first material supply chamber 895, and a third material supply chamber 8%.

The mask alignment chamber 891 includes at least a stage 851 and a substrate transfer mechanism 852.

The first transfer chamber 871 includes a substrate cassette raising and lowering mechanism, the second transfer chamber 872 includes a substrate transfer mechanism 853, and the third transfer chamber includes a substrate transfer mechanism 854.

Each of the first deposition chamber 892, the second deposition chamber 874, the second material supply chamber 894, the first material supply chamber 895, the third material supply chamber 896, the mask alignment chamber 891, the first transfer chamber 871, the second transfer chamber 872, and the third transfer chamber 873 is connected to an exhaust mechanism. The exhaust mechanism is selected in accordance with usage of the respective chambers, and may be, for example, an exhaust mechanism including a pump having an adsorption unit, such as a cryopump, a sputtering ion pump, or a titanium sublimation pump, an exhaust mechanism including a turbo molecular pump provided with a cold trap, or the like.

In a process of film deposition on the substrate, the substrate 850 or the substrate cassette is set in the load lock chamber 870, and transferred to the mask alignment chamber 891 by the substrate transfer mechanism 852. A mask to be used is picked up among a plurality of masks set in advance in the mask alignment chamber 891, and its position is aligned with the substrate over the stage 851. After the position alignment, the gate 880 is opened, and transferring to the first transfer chamber 871 is performed by the substrate transfer mechanism 852. After the substrate is transferred to the first transfer chamber 871, the gate 881 is opened, and transferring to the second transfer chamber 872 is performed by the substrate transfer mechanism 853.

The first deposition chamber 892 provided next to the second transfer chamber 872 through the gate 882 is a sputtering deposition chamber. The sputtering deposition chamber has a mechanism of applying voltage to the sputtering target by switching an RF power supply and a pulsed DC power supply. Furthermore, two or three kinds of sputtering targets can be set. In this embodiment, a single crystal silicon target, a sputtering target containing lithium cobalt oxide ($LiCoO_2$) as a main component, and a titanium target are set. It is possible to provide a substrate heating mechanism in the first deposition chamber 892 and perform film deposition while heating is performed up to a heater temperature of 700° C.

The negative electrode active material layer can be formed by a sputtering method using a single crystal silicon target. An $SiO_X$ film formed by a reactive sputtering method using an Ar gas and an $O_2$ gas may be used as the negative electrode active material layer in the negative electrode. A silicon nitride film formed by a reactive sputtering method using an Ar gas and an $N_2$ gas can be used as a sealing film. The positive electrode active material layer can be formed by a sputtering method using a sputtering target containing lithium cobalt oxide ($LiCoO_2$) as a main component. A conductive film to be a current collector can be formed by a sputtering method using a titanium target. A titanium nitride film formed by a reactive sputtering method using an Ar gas and an $N_2$ gas can be formed as the separation layer or the base film.

In the case where the positive electrode active material layer is formed, the mask and the substrate in an overlapped state are transferred from the second transfer chamber 872 to the first deposition chamber 892 by the substrate transfer mechanism 853, the gate 882 is closed, and then film deposition is performed by a sputtering method. After the deposition, the gate 882 and the gate 883 are opened, transferring to the heating chamber 893 is performed, the gate 883 is closed, and then heating can be performed. For this heat treatment in the heating chamber 893, an RTA (Rapid Thermal Anneal) apparatus, a resistance heating furnace, or a microwave heating apparatus can be used. As the RTA apparatus, a GRTA (Gas Rapid Termal Anneal) apparatus or an LRTA (Lamp Rapid Termal Anneal) apparatus can be used. The heat treatment in the heating chamber 893 can be performed in an atmosphere of nitrogen, oxygen, a rare gas, or dry air. In addition, heating time is longer than or equal to 1 minute and shorter than or equal to 24 hours.

After the film deposition or the heat treatment, the substrate and the mask are returned to the mask alignment chamber 891 and position alignment for a new mask is performed. The substrate and the mask after being subjected to the position alignment are transferred to the first transfer chamber 871 by the substrate transfer mechanism 852. The substrate is transferred by the raising and lowering mechanism of the first transfer chamber 871, the gate 884 is opened, and transferring to the third transfer chamber 873 is performed by the substrate transfer mechanism 854.

In the second deposition chamber 874 which is connected to the third transfer chamber 873 through the gate 885, film deposition by evaporation is performed.

FIG. 22 illustrates an example of a cross-sectional structure of the second deposition chamber 874. FIG. 22 corresponds to a schematic cross-sectional view taken along the dotted line in FIG. 21. The second deposition chamber 874 is connected to the exhaust mechanism 849, and the first material supply chamber 895 is connected to the exhaust mechanism 848. The second material supply chamber 894 is connected to the exhaust mechanism 847. The second deposition chamber 874 illustrated in FIG. 22 is an evaporation chamber where evaporation is performed using an evaporation source 856 that is transferred from the first material supply chamber 895. Evaporation sources are transferred from a plurality of material supply chambers and evaporation by vaporizing a plurality of substances at the same time, that is, co-evaporation can be performed. FIG. 22 illustrates an evaporation source including an evaporation boat 858 transferred from the second material supply chamber 894.

The second deposition chamber 874 is connected to the second material supply chamber 894 through the gate 886. The second deposition chamber 874 is connected to the first material supply chamber 895 through the gate 888. The second deposition chamber 874 is connected to the third material supply chamber 896 through the gate 887. Thus, ternary co-evaporation is possible in the second deposition chamber 874.

In a process of evaporation, first, the substrate is provided in a substrate holding portion 845. The substrate holding portion 845 is connected to a rotation mechanism 865. Then, a first evaporation material 855 is heated to some extent in the first material supply chamber 895, the gate 888 is opened when the evaporation rate becomes stable, and an arm 862 is extended so that the evaporation source 856 is transferred and stopped below the substrate. The evaporation source 856 includes the first evaporation material 855, a heater 857, and a container for storing the first evaporation material 855. Also in the second material supply chamber 894, a second evaporation material is heated to some extent, the gate 886 is opened when the evaporation rate becomes stable, and an arm 861 is extended so that the evaporation source is transferred and stopped below the substrate.

After that, a shutter 868 and an evaporation source shutter 869 are opened, and co-evaporation is performed. During the evaporation, the rotation mechanism 865 is rotated in order to improve the uniformity of the thickness. The substrate after being subjected to the evaporation is transferred to the mask alignment chamber 891 on the same route. In the case where the substrate is extracted from the manufacturing apparatus, the substrate is transferred from the mask alignment chamber 891 to the load lock chamber 870 and extracted.

FIG. 22 illustrates an example where the substrate 850 and a mask are held by the substrate holding portion 845. The substrate 850 (and the mask) is rotated by a substrate rotation mechanism, so that uniformity of film deposition can be increased. The substrate rotation mechanism may also serve as a substrate transfer mechanism.

The second deposition chamber 874 may include an imaging unit 863 such as a CCD camera. With the provision of the imaging unit 863, the position of the substrate 850 can be confirmed.

In the second deposition chamber 874, the thickness of a film deposited on a substrate surface can be estimated from results of measurements by a film thickness measurement mechanism 867. The film thickness measurement mechanism 867 may include a crystal oscillator, for example.

Note that in order to control the evaporation of vaporized evaporation materials, the shutter 868, which overlaps with the substrate, and the evaporation source shutter 869, which overlaps with the evaporation source 856 and the evaporation boat 858, are provided until the evaporation rate of the evaporation materials is stabilized.

In the evaporation source 856, an example of a resistance heating method is shown, but an EB (Electron Beam) evaporation method may be employed. In addition, although an example of a crucible as the container for the evaporation source 856 is shown, an evaporation boat may be used. As the first evaporation material 855, an organic material is put into the crucible heated by the heater 857. In the case where pellet-like or particle-like SiO or the like is used as the evaporation material, the evaporation boat 858 is used. The evaporation boat 858 is composed of three parts, and obtained by overlapping a member having a concave surface, a middle lid having two openings, and a top lid having one opening. Note that the evaporation may be performed after the middle lid is removed. The evaporation boat 858 functions as a resistor when current flows therethrough, and has a mechanism of heating itself.

Although an example of a multi-chamber apparatus is described in this embodiment, there is no particular limitation and an in-line manufacturing apparatus may be used.

This embodiment can be implemented in appropriate combination with the other embodiments.

Embodiment 6

In this embodiment, an example of a thin-film secondary battery including a battery control circuit or the like is described.

Figure 23A:
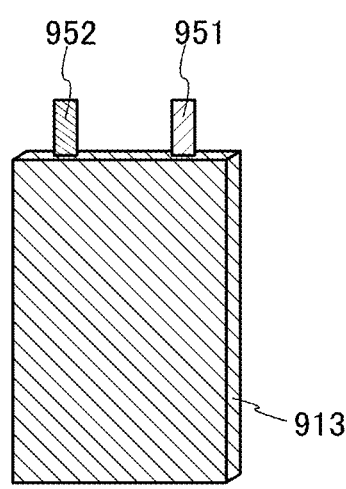
FIG. 23A is a perspective view illustrating an example of a battery cell.

FIG. 23A is an external view of a thin-film secondary battery. A secondary battery 913 includes a terminal 951 and a terminal 952. The terminal 951 and the terminal 952 are electrically connected to a positive electrode and a negative electrode, respectively. The secondary battery of one embodiment of the present invention has excellent cycle performance. In addition, the level of safety is high because of an all-solid-state secondary battery. Therefore, the secondary battery of one embodiment of the present invention can be suitably used as the secondary battery 913.

Figure 23B:
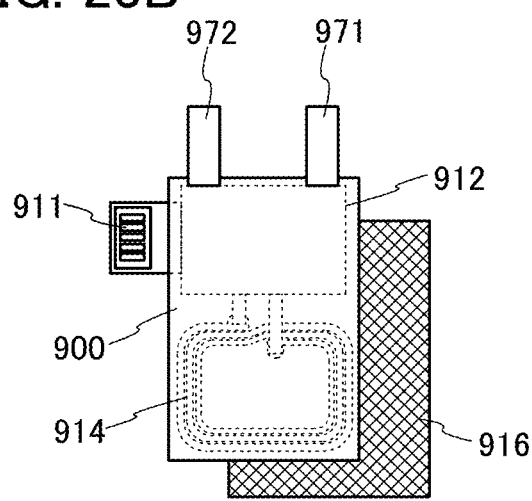
FIG. 23B is a perspective view of a circuit.

FIG. 23B is an external view of a battery control circuit. A battery control circuit shown in FIG. 23B includes a substrate 900 and a layer 916. A circuit 912 and an antenna 914 are provided over the substrate 900. The antenna 914 is electrically connected to the circuit 912. A terminal 971 and a terminal 972 are electrically connected to the circuit 912. The circuit 912 is electrically connected to a terminal 911.

The terminal 911 is connected to a device to which electric power of the thin-film-type solid-state secondary battery is supplied, for example. For example, the terminal 911 is connected to a display device, a sensor, or the like.

The layer 916 has a function of blocking an electromagnetic field from the secondary battery 913, for example. As the layer 916, for example, a magnetic body can be used.

Figure 23C:
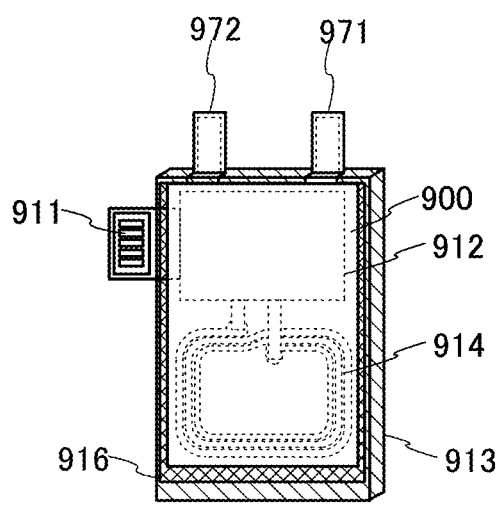
FIG. 23C is a perspective view of the battery cell and the circuit which overlap with each other.

FIG. 23C shows an example in which the battery control circuit shown in FIG. 23B is provided over the secondary battery 913. The terminal 971 and the terminal 972 are electrically connected to the terminal 951 and the terminal 952, respectively. The layer 916 is provided between the substrate 900 and the secondary battery 913.

A substrate having flexibility is preferably used as the substrate 900.

Figure 24A:
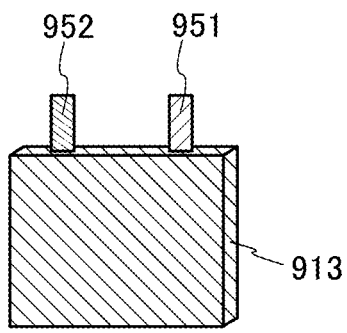
FIG. 24A is a perspective view illustrating an example of a battery cell.
Figure 24B:
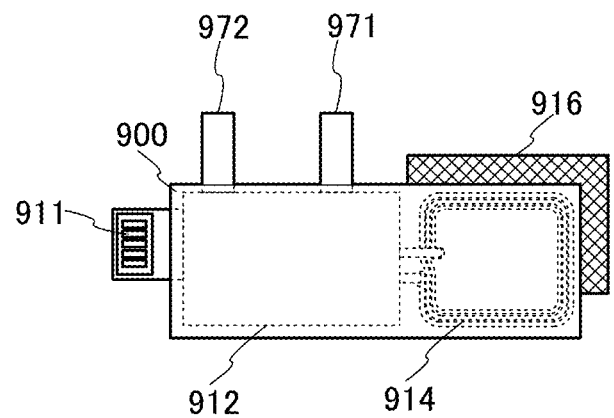
FIG. 24B is a perspective view of a circuit

By using a substrate having flexibility as the substrate 900, a thin battery control circuit can be achieved. As illustrated in FIG. 24D described later, the battery control circuit can be wound around the secondary battery.

Another example of a thin-film secondary battery including a battery control circuit or the like is described with reference to FIG. 24A to FIG. 24D. FIG. 24A is an external view of a thin-film-type solid-state secondary battery. A battery control circuit illustrated in FIG. 24B includes the substrate 900 and the layer 916.

Figure 24C:
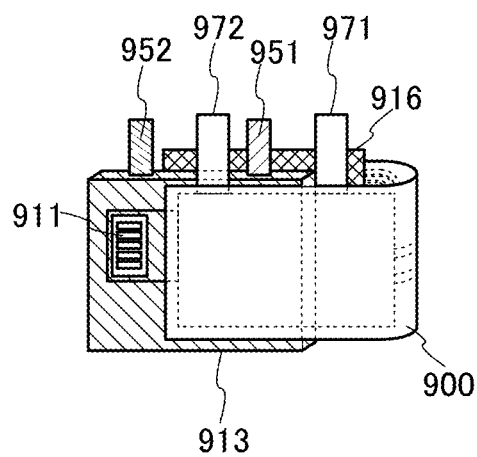
FIG. 24C and FIG. 24D are perspective views of the battery cell and the circuit which overlap with each other.
Figure 24D:
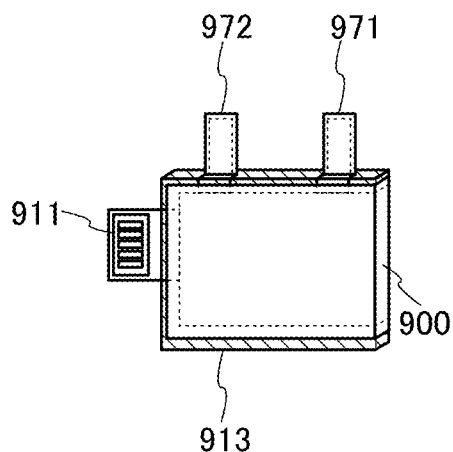

As illustrated in FIG. 24C, the substrate 900 is bent to fit the shape of the secondary battery 913, and the battery control circuit is provided around the secondary battery, whereby the battery control circuit can be wound around the secondary battery as illustrated in FIG. 24D. With such a structure, the secondary battery can be downsized.

This embodiment can be implemented in appropriate combination with the other embodiments.

Embodiment 7

In this embodiment, examples of electronic devices using thin-film secondary batteries are described with reference to FIG. 25A, FIG. 25B, and FIG. 26A to FIG. 26C. The secondary battery of one embodiment of the present invention has a high discharge capacity, a high cycle performance, and a high level of safety. Thus, the electronic devices have a high level of safety and can be used for a long time.

Figure 25A:
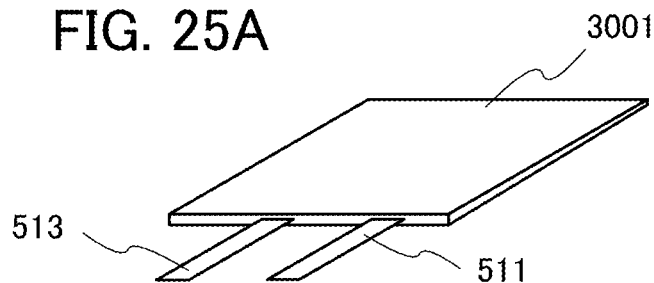
FIG. 25A is a perspective view of a battery cell.

FIG. 25A is an external perspective view of a thin-film-type secondary battery 3001. The thin-film-type secondary battery 3001 is subjected to sealing with a laminate film or an insulating film such that a positive electrode lead electrode 513 electrically connected to a positive electrode of a solid-state secondary battery and a negative electrode lead electrode 511 electrically connected to a negative electrode project.

Figure 25B:
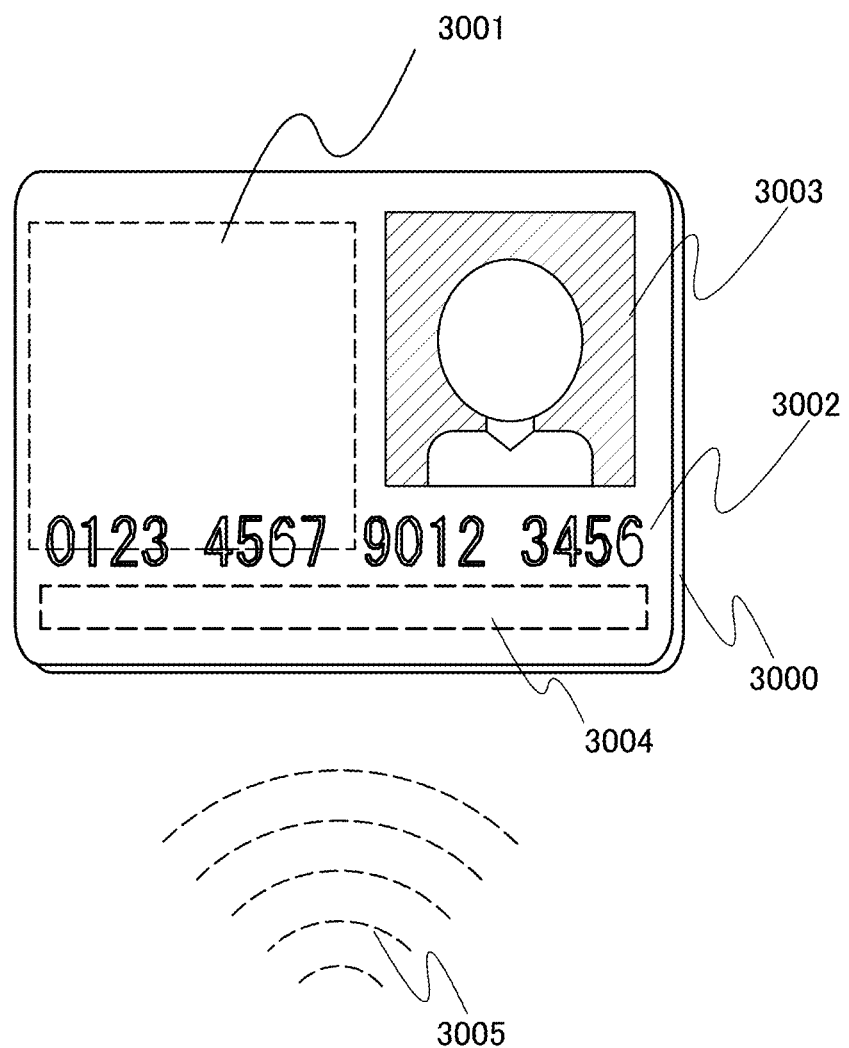
FIG. 25B is a diagram illustrating an example of an electronic device.

FIG. 25B illustrates an IC card which is an example of an application device using a thin-film-type secondary battery of the present invention. The thin-film-type secondary battery 3001 can be charged with electric power obtained by power feeding from a radio wave 3005. In an IC card 3000, an antenna, an IC 3004, and the thin-film-type secondary battery 3001 are provided. An ID 3002 and a photograph 3003 of a worker who wears the IC card 3000 are displayed on the IC card 3000. A signal such as an authentication signal can be transmitted from the antenna using the electric power charged in the thin-film-type secondary battery 3001.

An active matrix display device may be provided to display the ID 3002 and the photograph 3003. As examples of the active matrix display device, a reflective liquid crystal display device, an organic EL display device, electronic paper, or the like can be given. An image (a moving image or a still image) or time can be displayed on the active matrix display device. Electric power for the active matrix display device can be supplied from the thin-film-type secondary battery 3001.

A plastic substrate is used for the IC card, and thus an organic EL display device using a flexible substrate is preferable.

A solar cell may be provided instead of the photograph 3003. By irradiation with external light, light can be absorbed to generate electric power, and the thin-film-type secondary battery 3001 can be charged with the electric power.

Without limitation to the IC card, the thin-film-type secondary battery can be used for a power source of an in-vehicle wireless sensor, a secondary battery for a MEMS device, or the like.

Figure 26A:
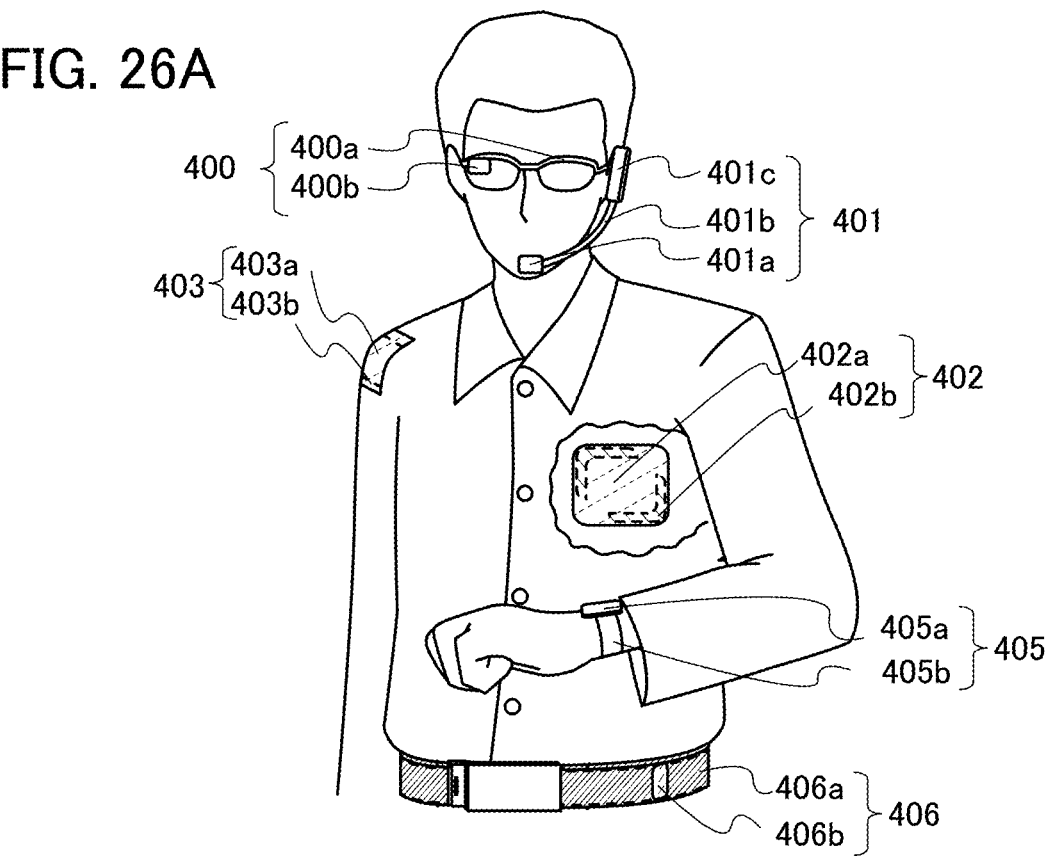
FIG. 26A to FIG. 26C are diagrams illustrating examples of electronic devices.

FIG. 26A illustrates examples of wearable devices. A secondary battery is used as a power source of a wearable device. To have improved splash resistance, water resistance, or dust resistance in daily use or outdoor use by a user, a wearable device is desirably capable of being charged wirelessly as well as being charged with a wire whose connector portion for connection is exposed.

For example, the secondary battery of one embodiment of the present invention can be incorporated in a glasses-type device 400 as illustrated in FIG. 26A. The glasses-type device 400 includes a frame 400a and a display portion 400b. A secondary battery is incorporated in a temple of the frame 400a having a curved shape, whereby the glasses-type device 400 can be lightweight, have a well-balanced weight, and be used continuously for a long time. When the secondary battery of one embodiment of the present invention is included, a structure that can support space saving due to a reduction in the size of a housing can be achieved.

Furthermore, the secondary battery of one embodiment of the present invention can be incorporated in a headset-type device 401. The headset-type device 401 includes at least a microphone portion 401a, a flexible pipe 401b, and an earphone portion 401c. The secondary battery can be provided in the flexible pipe 401b or the earphone portion 401c. When the secondary battery of one embodiment of the present invention is included, a structure that can support space saving due to a reduction in the size of a housing can be achieved.

The secondary battery of one embodiment of the present invention can also be incorporated in a device 402 that can be directly attached to a human body. A secondary battery 402b can be provided in a thin housing 402a of the device 402. When the secondary battery of one embodiment of the present invention is included, a structure that can support space saving due to a reduction in the size of a housing can be achieved.

The secondary battery of one embodiment of the present invention can also be incorporated in a device 403 that can be attached to clothing. A secondary battery 403b can be provided in a thin housing 403a of the device 403. When the secondary battery of one embodiment of the present invention is included, a structure that can support space saving due to a reduction in the size of a housing can be achieved.

Furthermore, the secondary battery of one embodiment of the present invention can be incorporated in a belt-type device 406. The belt-type device 406 includes a belt portion 406a and a wireless power feeding and receiving portion 406b, and the secondary battery can be incorporated in the belt portion 406a. When the secondary battery of one embodiment of the present invention is included, a structure that can support space saving due to a reduction in the size of a housing can be achieved.

The secondary battery of one embodiment of the present invention can also be incorporated in a watch-type device 405. The watch-type device 405 includes a display portion 405a and a belt portion 405b, and the secondary battery can be provided in the display portion 405a or the belt portion 405b. When the secondary battery of one embodiment of the present invention is included, a structure that can support space saving due to a reduction in the size of a housing can be achieved.

The display portion 405a can display various kinds of information such as reception information of an e-mail or an incoming call in addition to time.

Since the watch-type device 405 is a type of wearable device that is directly wrapped around an arm, a sensor that measures pulse, blood pressure, or the like of a user can be incorporated therein. Data on the exercise quantity and health of the user can be accumulated and used for health maintenance.

Figure 26B:
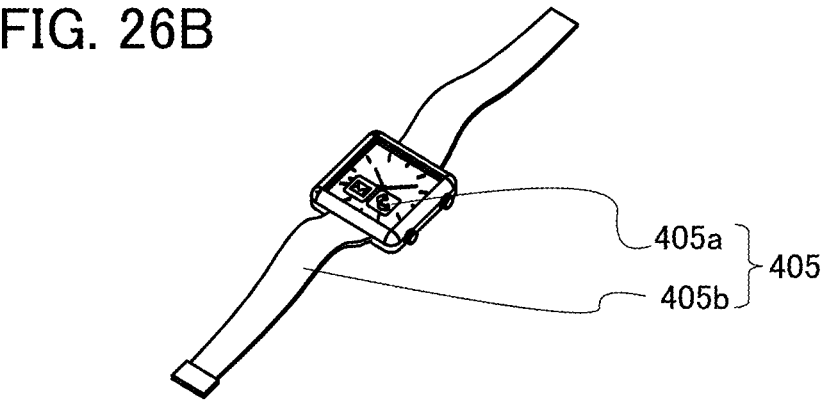

FIG. 26B shows a perspective view of the watch-type device 405 that is detached from an arm.

Figure 26C:
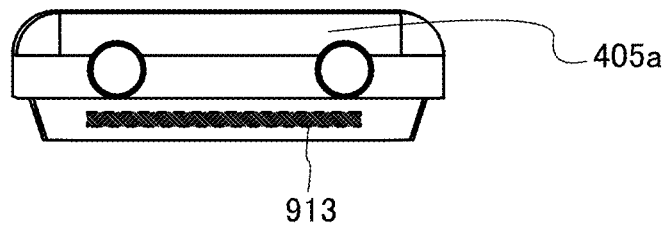

FIG. 26C shows a side view. FIG. 26C illustrates a state where the secondary battery 913 is incorporated in the watch-type device 405. The secondary battery 913 is the secondary battery described in Embodiment 5. The secondary battery 913 is provided to overlap with the display portion 405a and is small and lightweight.

This embodiment can be implemented in appropriate combination with the other embodiments.

Embodiment 8

In this embodiment, electronic devices each using the secondary battery including the positive electrode of one embodiment of the present invention are described with reference to FIG. 27A to FIG. 27C. The secondary battery including the positive electrode of one embodiment of the present invention has a high discharge capacity, a high cycle performance, and a high level of safety. Such a secondary battery can be favorably used for electronic devices given below. The secondary battery can be favorably used particularly for an electronic device that is required to have durability.

Figure 27A:
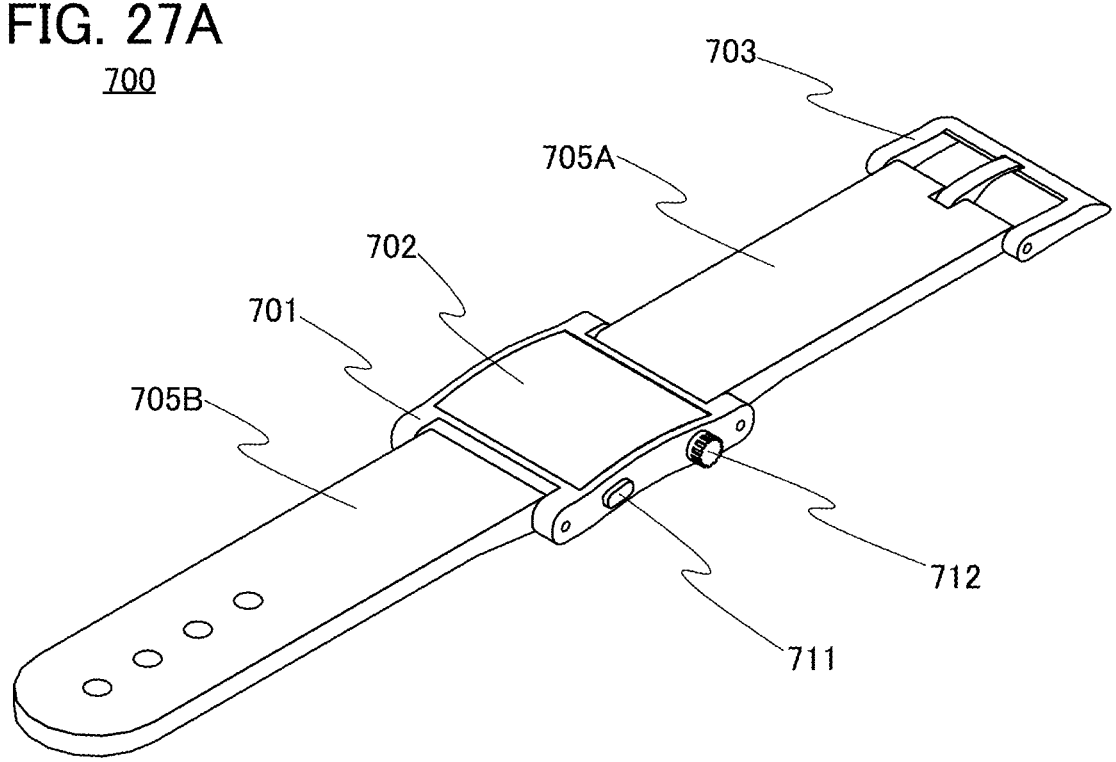
FIG. 27A to FIG. 27C are diagrams illustrating an example of an electronic device.

FIG. 27A is a perspective view of a watch-type portable information terminal (also called a smartwatch) 700. The portable information terminal 700 includes a housing 701, a display panel 702, a clasp 703, bands 705A and 705B, and operation buttons 711 and 712.

The display panel 702 mounted in the housing 701 doubling as a bezel includes a rectangular display region. The display region has a curved surface. The display panel 702 preferably has flexibility. Note that the display region may be non-rectangular.

The bands 705A and 705B are connected to the housing 701. The clasp 703 is connected to the band 705A. The band 705A and the housing 701 are connected such that a connection portion rotates via a pin. In a similar manner, the band 705B and the housing 701 are connected to each other and the band 705A and the clasp 703 are connected to each other.

Figure 27B:
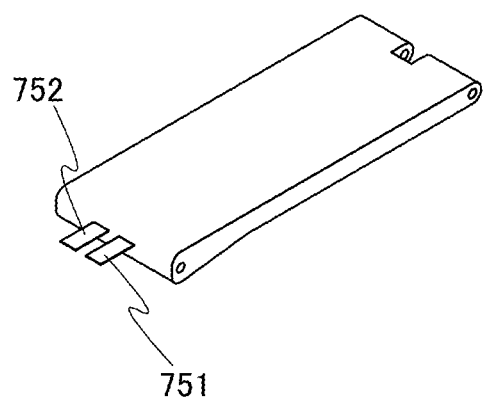
Figure 27C:
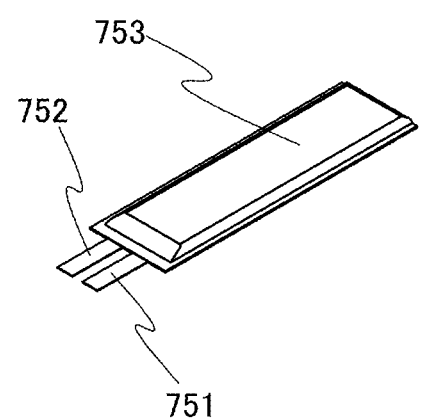

FIG. 27B and FIG. 27C are perspective views of the band 705A and a secondary battery 750, respectively. The band 705A includes the secondary battery 750. As the secondary battery 750, the secondary battery described in the above embodiment can be used, for example. The secondary battery 750 is embedded in the band 705A, and a positive electrode lead 751 and a negative electrode lead 752 partly protrude from the band 705A (see FIG. 27B). The positive electrode lead 751 and the negative electrode lead 752 are electrically connected to the display panel 702. The surface of the secondary battery 750 is covered with an exterior body 753 (see FIG. 27C). Note that the pin may function as an electrode. Specifically, through the pin that connects the band 705A and the housing 701, the positive electrode lead 751 and the display panel 702 may be electrically connected to each other and the negative electrode lead 752 and the display panel 702 may be electrically connected to each other. This simplifies the structure of the connection portion between the band 705A and the housing 701.

The secondary battery 750 has flexibility. Thus, the band 705A can be formed so as to incorporate the secondary battery 750. For example, the secondary battery 750 is set in a mold that the outside shape of the band 705A fits and a material of the band 705A is poured in the mold and cured, so that the band 705A illustrated in FIG. 27B can be formed.

In the case where a rubber material is used as the material for the band 705A, rubber is cured through heat treatment. For example, in the case where fluorine rubber is used as a rubber material, it is cured through heat treatment at 170° C. for 10 minutes. In the case where silicone rubber is used as a rubber material, it is cured through heat treatment at 150° C. for 10 minutes.

Examples of the material for the band 705A include fluorine rubber, silicone rubber, fluorosilicone rubber, and urethane rubber.

Note that the portable information terminal 700 in FIG. 27A can have a variety of functions such as a function of displaying a variety of data (e.g., a still image, a moving image, and a text image) on the display region, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display region.

The housing 701 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the portable information terminal 700 can be manufactured using a light-emitting element for the display panel 702.

Although FIG. 27A illustrates the example where the secondary battery 750 is incorporated in the band 705A, the secondary battery 750 may be incorporated in the band 705B. The band 705B can be formed using a material similar to that for the band 705A.

This embodiment can be implemented in appropriate combination with the other embodiments.

Embodiment 9

A device described in this embodiment includes at least a biosensor and a solid-state secondary battery that supplies electric power to the biosensor, and can obtain various kinds of biological data using infrared light and visible light and make the memory store the data. Such biological data can be used for both user's personal authentication uses and health care uses. The secondary battery of one embodiment of the present invention has a high discharge capacity, a high cycle performance, and a high level of safety. Thus, the device has a high level of safety and can be used for a long time.

The biosensor is a sensor for obtaining biological data and obtains biological data that can be used for health care uses. Examples of biological data include pulse waves, blood glucose levels, oxygen saturation levels, and neutral fat concentrations. The data is stored in the memory.

Furthermore, the device described in this embodiment is preferably provided with a unit for obtaining other biological data. Examples of such biological data include internal biological data such as an electrocardiogram, a blood pressure, and a body temperature and superficial biological data such as facial expression, a complexion, and a pupil. In addition, data on the number of steps taken, exercise intensity, a height difference in a movement, and a meal (e.g., calorie intake and nutrients) are important for health care. The use of a plurality of kinds of biological data and the like enables complex management of physical conditions, leading to not only daily health management but also early detection of injuries and diseases.

Blood pressure can be calculated from an electrocardiogram and a difference in timing of two pulsations of a pulse wave (a period of pulse wave propagation time), for example. A high blood pressure results in a short pulse wave propagation time, whereas a low blood pressure results in a long pulse wave propagation time. The body conditions of the user can be estimated from a relationship between the heart rate and the blood pressure that are calculated from the electrocardiogram and the pulse wave. For example, when both the heart rate and the blood pressure are high, it can be estimated that the user is nervous or excited, whereas when both the heart rate and the blood pressure are low, it can be estimated that the user is relaxed. When the state where the blood pressure is low and the heart rate is high is continued, the user might suffer from a heart disease or the like.

The user can check the biological data measured with the electronic device, one's own body conditions estimated on the basis of the data, and the like at any time; thus, health awareness is improved. This may inspire the user to reconsider the daily habits, for example, to avoid over-eating and over-drinking, get enough exercise, manage one's physical conditions, and have a medical examination at a medical institution as necessary.

Figure 28A:
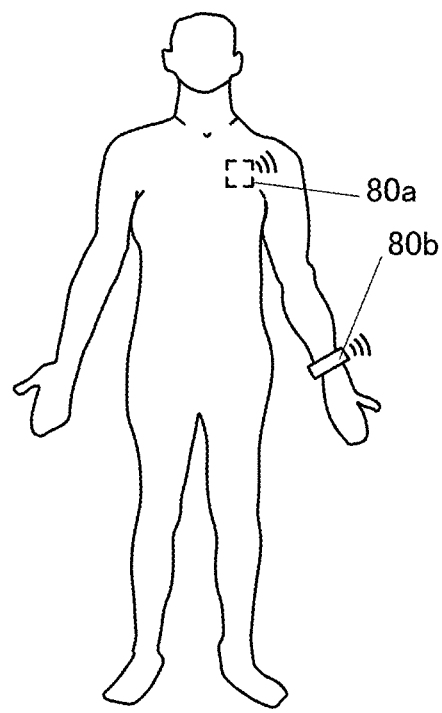
FIG. 28A is a schematic view of electronic devices of embodiments of the present invention.

Data may be shared among a plurality of biosensors. FIG. 28A illustrates an example in which a biosensor 80a is embedded in a user's body and an example in which a biosensor 80b is worn on the user's wrist. Devices illustrated in FIG. 28A are, for example, a device including the biosensor 80a capable of electrocardiogram monitoring and a device including the biosensor 80b capable of heart rate monitoring by optical measurement of the pulse on the user's arm. Note that the wearable device such as a watch or a wristband illustrated in FIG. 28A is not limited to a heart rate meter, and a variety of types of biosensors can be used.

As the predetermined conditions of the embedded device illustrated in FIG. 28A, the device is small, hardly generates heat, and causes no allergic reaction or the like even when the device is in contact with the user's skin. The secondary battery used in the device of one embodiment of the present invention is preferable because it has features of being small, hardly generating heat, and causing no allergic reaction or the like. The embedded device preferably incorporates an antenna so as to enable wireless charging.

The device embedded into the living body, which is illustrated in FIG. 28A, is not limited to the biosensor capable of electrocardiogram monitoring, and a biosensor capable of obtaining other biological data can be used.

Figure 28B:
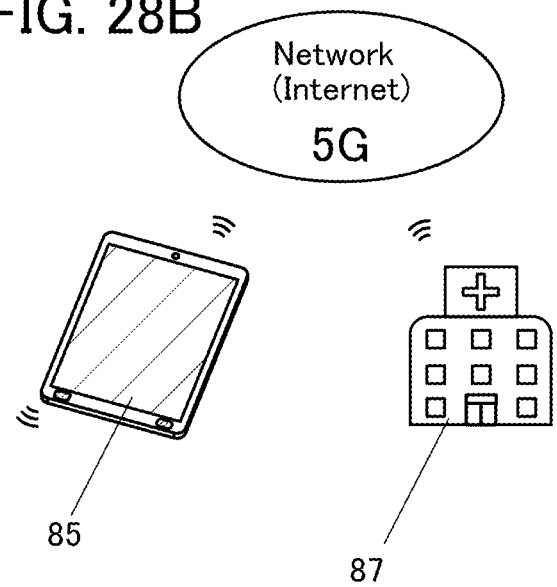
FIG. 28B is a diagram illustrating part of a system.

The biosensor 80b incorporated in the device may temporarily store data in a memory incorporated in the device. Alternatively, the data obtained by the biosensor may be transmitted to a portable data terminal 85 in FIG. 28B with or without a wire, and waveforms may be detected in the portable data terminal 85. The portable data terminal 85 corresponds to a smartphone or the like and can detect whether or not a problem such as an irregular heartbeat occurs from the data obtained from the biosensors. In the case where the data obtained by the plurality of biosensors are transmitted to the portable data terminal 85 with a wire, it is preferable that data obtained by connection with a wire be collectively transmitted. Note that date may be automatically given to the detected data, and the data may be stored in a memory of the portable data terminal 85 and managed personally. Alternatively, the data may be transmitted to a medical institution 87 such as a hospital via a network (including the Internet) as illustrated in FIG. 28B. The data can be managed in a data server of the hospital and used as inspection data in treatment. Since medical data sometimes swells to a huge amount of data, an network including Bluetooth (registered trademark) and a frequency band from 2.4 GHz to 2.4835 GHz may be used for the high-speed data communication between the biosensor 80b and the portable data terminal 85, and the fifth-generation (5G) wireless system may be used for the high-speed data communication between the portable data terminals 85. For the fifth-generation (5G) wireless system, frequency bands of the 3.7 GHz band, the 4.5 GHz band, and the 28 GHz band are used. With use of the fifth-generation (5G) wireless system, it becomes possible to obtain data and transmit the data to the medical institution 87, not only from home but also from the outside. As a result, data on poor physical conditions of the user can be accurately obtained and can be utilized for treatment performed later. Note that the portable data terminal 85 can have a structure illustrated in FIG. 28C.

Figure 28C:
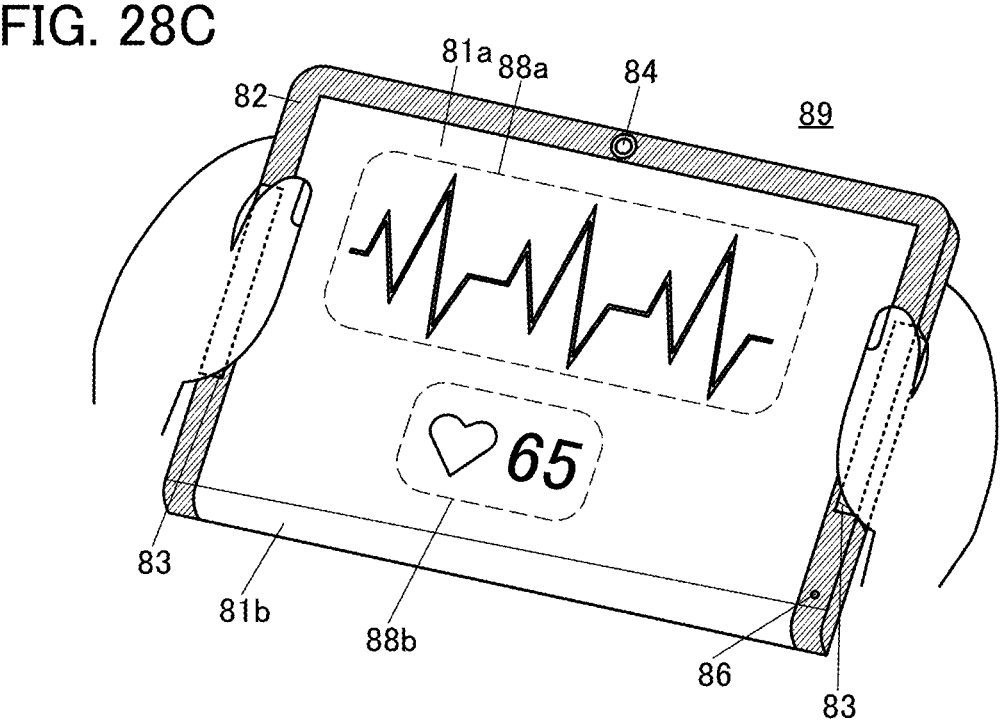
FIG. 28C is an example of a perspective view of a portable data terminal used for the system.

FIG. 28C illustrates another example of a portable data terminal. A portable data terminal 89 includes a speaker, a pair of electrodes 83, a camera 84, and a microphone 86, in addition to a secondary battery.

The pair of electrodes 83 is provided in parts of a housing 82 with a display portion 81a therebetween. A display portion 81b is a curved region. The electrodes 83 function as electrodes for obtaining biological information.

Providing the pair of electrodes 83 in the longitudinal direction of the housing 82 as illustrated in FIG. 28C enables biological information to be obtained with the user being unconscious when the user uses the portable data terminal 89 with a landscape screen.

An example of the usage state of the portable data terminal 89 is illustrated. The display portion 81a can display electrocardiogram data 88a and heart-rate data 88b, which are obtained with the pair of electrodes 83.

This function is not necessary when the biosensor 80a is embedded in the user's body as illustrated in FIG. 27A. By contrast, when the biosensor 80a is not embedded, the user grasps the pair of electrodes 83 with the user's both hands, so that the electrocardiogram can be obtained. Even when the biosensor 80a is embedded in the user's body, the portable data terminal 89 illustrated in FIG. 28C can be used for comparing the electrocardiogram data with another user's in order to check whether the biosensor 80a operates normally.

The camera 84 can capture an image of the user's face, for example. Biological data on facial expression, a pupil, a complexion, and the like can be obtained from the image of the user's face.

The microphone 86 can obtain the user's voice. Voiceprint data that can be used for voiceprint authentication can be obtained from the obtained voice data. When voice data is regularly obtained and a change in voice quality is monitored, the voice data can be utilized for health management. Needless to say, talking on a video call with a doctor at the medical institution 87 is possible with use of the microphone 86, the camera 84, and the speaker.

With use of the device illustrated in FIG. 28A and the portable data terminal 89 illustrated in FIG. 28C, a remote medical support system can be achieved, in which data is transmitted from a remote area to a hospital to see a doctor.

This embodiment can be implemented in appropriate combination with the other embodiments.

REFERENCE NUMERALS

100: positive electrode, 100a: region, 101: positive electrode active material layer, 102: separation layer, 103: positive electrode current collector layer, 104: base film, 105: cap layer, 110: substrate, 111: substrate, 200: secondary battery, 201: secondary battery, 202: secondary battery, 203: solid electrolyte layer, 204: negative electrode active material layer, 205: negative electrode current collector layer, 206: protective layer, 209: separation layer, 210: negative electrode, 211: negative electrode, 212: negative electrode, 213: solid electrolyte layer, 215: positive electrode current collector layer, 220: separator, 221: electrolyte solution, 222: exterior body, 223a: lead electrode, 223b: lead electrode, 230: secondary battery, 231: secondary battery.

The invention claimed is:

1. A positive electrode for a secondary battery,
wherein the positive electrode for a secondary battery comprises n positive electrode active material layers, n-1 separation layer(s), and a positive electrode current collector layer,
wherein n is an integer greater than or equal to 2,
wherein the positive electrode active material layers and the separation layer(s) are alternately stacked,
wherein a positive electrode active material layer comprises lithium cobalt oxide,
wherein the separation layer comprises titanium oxide, and
wherein a (001) plane of a crystal structure belonging to a space group R-3m of the positive electrode active material layer is parallel to a (100) plane of a crystal structure belonging to a space group P42/mnm of the separation layer.

2. The positive electrode for a secondary battery, according to claim 1,
wherein the separation layer comprises titanium nitride, and
wherein the (001) plane of a crystal structure belonging to the space group R-3m of the positive electrode active material layer is parallel to a (100) plane of a crystal structure belonging to a space group Fm-3m of the separation layer.

3. The positive electrode for a secondary battery, according to claim 2,
wherein at a depth of charge of 0.875, a volume change rate of a layered structure comprising the lithium cobalt oxide and the titanium nitride is in a range of −2% to 1% of the reference, and
wherein the reference is a volume change rate of the layered structure comprising the lithium cobalt oxide and the titanium nitride at a depth of charge of 0.

4. The positive electrode for a secondary battery, according to claim 2,
wherein at a depth of charge of 0.875, a c-axis change amount of a layered structure comprising the lithium cobalt oxide and the titanium nitride is in a range of −1 Å to 0 Å from the reference, and
wherein the reference is a c-axis change amount of the layered structure comprising the lithium cobalt oxide and the titanium nitride at a depth of charge of 0.

5. The positive electrode for a secondary battery, according to claim 1,
wherein the positive electrode active material layer comprises one or more of nickel, aluminum, magnesium, or fluorine.

6. The positive electrode for a secondary battery, according to claim 5,
wherein the positive electrode active material layer comprises nickel, aluminum, magnesium, and fluorine, and
wherein, assuming that the number of cobalt atoms contained in the positive electrode active material layer is 100, the number of nickel atoms is greater than or equal to 0.05 and less than or equal to 2, the number of aluminum atoms is greater than or equal to 0.05 and less than or equal to 2, and the number of magnesium atoms is greater than or equal to 0.1 and less than or equal to 6.

7. A secondary battery comprising:
the positive electrode for a secondary battery, according to claim 1;
a solid electrolyte; and
a negative electrode.

8. An electronic device comprising the secondary battery according to claim 7.

9. The positive electrode for a secondary battery, according to claim 1,
wherein a (104) plane of a crystal structure belonging to the space group R-3m of the positive electrode active material layer is parallel to the (100) plane of the crystal structure belonging to the space group P42/mnm of the separation layer.

10. The positive electrode for a secondary battery, according to claim 1,
   wherein the separation layer comprises titanium nitride, and
   wherein a (104) plane of a crystal structure belonging to the space group R-3m of the positive electrode active material layer is parallel to a (100) plane of a crystal structure belonging to a space group Fm-3m of the separation layer.

11. The positive electrode for a secondary battery, according to claim 1,
   wherein at a depth of charge of 0.875, a volume change rate of a layered structure comprising the lithium cobalt oxide and the titanium oxide is in a range of −2% to 1% of the reference, and
   wherein the reference is a volume change rate of the layered structure comprising the lithium cobalt oxide and the titanium oxide at a depth of charge of 0.

12. The positive electrode for a secondary battery, according to claim 1,
   wherein at a depth of charge of 0.875, a c-axis change amount of a layered structure comprising the lithium cobalt oxide and the titanium oxide is in a range of −1 Å to 0 Å from the reference, and
   wherein the reference is a c-axis change amount of the layered structure comprising the lithium cobalt oxide and the titanium oxide at a depth of charge of 0.

* * * * *